US009468859B2

(12) United States Patent
Barkouras

(10) Patent No.: US 9,468,859 B2
(45) Date of Patent: Oct. 18, 2016

(54) DEVICES AND METHODS FOR CREATING PRINTS ON A SURFACE

(71) Applicant: Trina Barkouras, Corona del Mar, CA (US)

(72) Inventor: Trina Barkouras, Corona del Mar, CA (US)

( * ) Notice: Subject to any disclaimer, the term of this patent is extended or adjusted under 35 U.S.C. 154(b) by 117 days.

(21) Appl. No.: 14/298,632

(22) Filed: Jun. 6, 2014

(65) Prior Publication Data

US 2015/0352456 A1 Dec. 10, 2015

(51) Int. Cl.

| | |
|---|---|
| ***G09B 11/10*** | (2006.01) |
| ***A63H 33/00*** | (2006.01) |
| ***B41K 1/00*** | (2006.01) |
| ***B41K 1/04*** | (2006.01) |
| ***B44D 2/00*** | (2006.01) |

(52) U.S. Cl.

CPC ............... *A63H 33/00* (2013.01); *B41K 1/003* (2013.01); *B41K 1/04* (2013.01); *B44D 2/002* (2013.01)

(58) Field of Classification Search

USPC ............ 434/81, 84, 85, 87, 96, 98; 101/327, 101/333; 26/575

See application file for complete search history.

(56) References Cited

U.S. PATENT DOCUMENTS

| | | | | | |
|---|---|---|---|---|---|
| 305,674 | A | | 9/1884 | Dalzell | |
| D37,342 | S | | 2/1905 | Dzubay | |
| 1,698,731 | A | | 1/1929 | Otto | |
| 1,946,250 | A | | 2/1934 | Whaley | |
| 2,061,510 | A | | 11/1936 | Drumpelmann | |
| D123,428 | S | | 8/1940 | Buckingham | |
| D132,904 | S | | 4/1942 | Buckingham | |
| D138,602 | S | | 6/1944 | Merralls | |
| 2,565,283 | A | | 8/1951 | Throckmorton | |
| D176,370 | S | | 12/1955 | Natale | |
| D188,135 | S | | 6/1960 | Koenig | |
| D199,042 | S | | 9/1964 | Douglas | |
| 3,389,851 | A | | 6/1968 | Clark | |
| 3,400,485 | A | | 9/1968 | Callin et al. | |
| 3,832,800 | A | | 9/1974 | Selesny | |
| 3,948,173 | A | * | 4/1976 | Barasch | B41K 1/52 101/333 |
| 4,014,450 | A | | 3/1977 | Girotti | |
| 4,058,214 | A | | 11/1977 | Mancuso | |
| 4,061,241 | A | | 12/1977 | Retelny | |
| 4,291,622 | A | * | 9/1981 | Bengtsson | B41K 1/08 101/109 |
| 4,392,425 | A | * | 7/1983 | Capezzuto | B41K 1/56 101/327 |
| 4,828,114 | A | | 5/1989 | Bardeen | |
| D305,698 | S | | 1/1990 | Chen | |
| 4,923,058 | A | | 5/1990 | Dennison | |
| 5,074,417 | A | | 12/1991 | Kenny | |
| 5,191,837 | A | * | 3/1993 | Bolton | B41K 1/56 101/333 |
| 5,394,989 | A | | 3/1995 | Delson | |

(Continued)

FOREIGN PATENT DOCUMENTS

FR 1452212 2/1966

*Primary Examiner* — Kurt Fernstrom

(74) *Attorney, Agent, or Firm* — Novel IP

(57) ABSTRACT

An apparatus and kit for creating prints on a surface is provided. The kit includes at least one stamp and a material for depositing the stamp on a surface. The stamp has one or more pieces of sponge adhered to a front surface of a rigid backing material, the pieces of sponge forming a shape desired for printing. A back surface of the backing material has a handle for holding the stamp. The material is a powder that may be partially water-soluble, forming a paint-like mixture or that may form a suspension when mixed. Prints are made by dipping the front surface of the backing material in the paint-like mixture causing the one or more pieces of sponge to absorb the paint-like mixture and pressing the sponge pieces against the surface.

17 Claims, 24 Drawing Sheets

(56) References Cited

U.S. PATENT DOCUMENTS

| | | | | | |
|---|---|---|---|---|---|
| 5,435,240 | A * | 7/1995 | Fromm | G09B 11/06 101/33 |
| 5,522,507 | A | 6/1996 | Cruz | |
| 5,586,500 | A * | 12/1996 | Takami | B41K 1/32 101/125 |
| 5,902,111 | A * | 5/1999 | Lindsey | B44D 2/002 434/81 |
| 6,266,186 | B1 * | 7/2001 | Greiner | G02B 27/2207 359/464 |
| 6,289,806 | B2 * | 9/2001 | Hirano | 101/333 |
| 6,360,658 | B1 * | 3/2002 | Benson | B41K 1/22 101/109 |
| 6,558,221 | B1 * | 5/2003 | Yang | A63H 3/365 446/100 |
| 6,626,105 | B1 * | 9/2003 | Linehan | B41K 1/08 101/104 |
| 6,802,715 | B1 * | 10/2004 | Wotton | B05C 17/00 206/1.7 |
| 7,776,108 | B2 * | 8/2010 | Shah | C09B 67/0069 8/550 |
| 8,006,615 | B1 * | 8/2011 | Allen | B41K 1/32 101/125 |
| 2001/0047951 | A1 * | 12/2001 | O'Connor | A45D 34/04 206/575 |
| 2002/0128081 | A1 * | 9/2002 | Clarke | A01K 5/0114 472/81 |
| 2007/0067937 | A1 | 3/2007 | Federlein | |
| 2009/0025590 | A1 | 1/2009 | Hebda | |
| 2009/0282992 | A1 | 11/2009 | Mulrooney | |
| 2009/0317774 | A1 * | 12/2009 | Sharp | B44D 2/002 434/84 |

* cited by examiner

DEVICES AND METHODS FOR CREATING PRINTS ON A SURFACE

FIELD

The present specification generally relates to a kit for making pre-designed prints on a surface.

BACKGROUND

In general, mythological tales and/or folklore are associated with traditions that people follow. For example, tales of the Easter Bunny, the Tooth Fairy, and Santa's Reindeer are very popular. It is a common tradition to create paw prints on a floor or other surface so that parents can provide their children with the illusion that one of these folkloric creatures or people have arrived or paid a visit to their location. For example, on Easter, a parent may leave rabbit paw prints on the floor or other surface to represent the Easter Bunny's arrival. Similarly, parents sometimes leave prints of Tooth Fairy wings near their child's bed depicting the arrival of the Tooth Fairy to collect any fallen teeth.

Various devices are currently available that enable the creation of such prints on desired surfaces. However, there is need for a device that allows a user to repeatedly make a desired print on a surface easily, and without the use of any specific ability or knowledge.

There is also a need for a device/kit that provides all materials for making prints on a surface that is easy to use.

There is also a need for a device/kit that provides all materials for making prints on a surface whereby the prints are easy to remove.

SUMMARY

The present specification discloses a kit for creating a colored shape on a surface comprising: at least one stamper, comprising a rigid carrier having a front surface and a back surface and a spongy material adhered to the front surface, the material being shaped into a predefined form and being adhered such that it extends outward from the front surface; a solid, granular material; and, a tray having a top periphery and a base defining a recessed area.

Optionally, said solid, granular material is contained within a package wherein the package of solid, granular material is configured to fit within the recessed area of said tray. Optionally, said stamper has a periphery that is configured to fit within the top periphery of said tray.

Optionally, said back surface further comprises a handle wherein said handle comprises a pair of semi-circular portions that, in a first configuration, are adapted to be raised perpendicular to the back surface and, in a second configuration, are adapted to lay flat against the back surface.

Optionally, said solid, granular material is a powder. The powder is at least partially water soluble and forms a solution capable of being absorbed into the spongy material of the stamper. Optionally, said powder forms a suspension when mixed with a liquid.

Optionally, the solid, granular material is one of limestone powder, talcum powder, plaster of Paris, flour, powdered sugar, paint powder, magnesium carbonate, magnesium silicate, calcium sulphate, or calcium hydroxide.

Optionally, said spongy material is one of sponge rubber, sea sponge, cellulose sponge, natural sponge, low-density polyether sponge, double blown polyester sponge, polyvinyl alcohol (PVA) sponge, polyurethane foam, high density foam, foam rubber, latex foam rubber, NASA foam, miracle foam, evlon foam, viscoelastic foam, high resilience foam, re-bonded foam, closed cell foam, or dry fast foam.

The present specification also discloses a kit for creating a colored shape on a surface comprising: at least one stamper, comprising a rigid carrier having a front surface and a back surface and a spongy material adhered to the front surface, the material being shaped into a predefined form and being adhered such that it extends outward from the front surface, thereby creating a raised pattern; a container comprising a liquid material; and, a tray having a top periphery and a base defining a recessed area.

Optionally, container of liquid material is configured to fit within the recessed area of said tray. Optionally, said stamper has a periphery that is configured to fit within the top periphery of said tray.

Optionally, said back surface further comprises a handle wherein said handle comprises a pair of semi-circular portions that, in a first configuration, are adapted to be raised perpendicular to the back surface and, in a second configuration, are adapted to lay flat against the back surface.

Optionally, said spongy material is one of sponge rubber, sea sponge, cellulose sponge, natural sponge, low-density polyether sponge, double blown polyester sponge, polyvinyl alcohol (PVA) sponge, polyurethane foam, high density foam, foam rubber, latex foam rubber, NASA foam, miracle foam, evlon foam, viscoelastic foam, high resilience foam, re-bonded foam, closed cell foam, or dry fast foam.

The present specification also discloses a kit for creating a colored shape on a surface comprising: at least one stamper, comprising a rigid carrier having a front surface and a back surface, wherein said front surface comprises a pattern; a plurality of separate spongy material pieces, each having an adhesive backing, wherein said a plurality of separate spongy material pieces are adapted to be adhered on the front surface such that each of said spongy material pieces extends outward from the front surface; a solid, granular material; and, a tray having a top periphery and a base defining a recessed area.

Optionally, said solid, granular material is contained within a package wherein the package of solid, granular material is configured to fit within the recessed area of said tray. Optionally, said stamper has a periphery that is configured to fit within the top periphery of said tray.

Optionally, back surface further comprises a handle wherein said handle comprises a pair of semi-circular portions that, in a first configuration, are adapted to be raised perpendicular to the back surface and, in a second configuration, are adapted to lay flat against the back surface.

Optionally, the solid, granular material is one of limestone powder, talcum powder, plaster of Paris, flour, powdered sugar, paint powder, magnesium carbonate, magnesium silicate, calcium sulphate, or calcium hydroxide.

Optionally, said spongy material is one of sponge rubber, sea sponge, cellulose sponge, natural sponge, low-density polyether sponge, double blown polyester sponge, polyvinyl alcohol (PVA) sponge, polyurethane foam, high density foam, foam rubber, latex foam rubber, NASA foam, miracle foam, evlon foam, viscoelastic foam, high resilience foam, re-bonded foam, closed cell foam, or dry fast foam.

The present specification also discloses a kit for creating a colored shape on a surface comprising: at least one stamping device comprising a rigid carrier having a front surface and a back surface and an absorbent material adhered to the front surface, the absorbent material being shaped into a predefined form and being adhered such that it extends outward from the front surface; a solid, granular material; and, a tray having a top periphery and a base defining a recessed area.

Optionally, said solid, granular material is contained within a package wherein the package is configured to fit within the recessed area of said tray. Optionally, said solid, granular material is a powder material. The powder material is at least partially water soluble and, when mixed with water, forms a solution capable of being absorbed into the absorbent material of the stamping device.

Optionally, said stamping device has a periphery that is configured to fit within the top periphery of said tray.

The back surface of said rigid carrier may comprise a pre-fixed handle for manipulating said stamping device. Optionally, the kit further comprises a handle configured to be affixed to said back surface by a user, said handle having a pair of contact portions and a pair of grasping portions and being configurable between a first configuration and a second configuration, wherein, when in said first configuration, said handle is designed to lay flat and, when in said second configuration, said contact portions affix to said back surface of said rigid carrier and said grasping portions are configured to be handled by said user.

The solid, granular material may be any one of limestone powder, talcum powder, plaster of Paris, flour, powdered sugar, paint powder, magnesium carbonate, magnesium silicate, calcium sulphate, calcium hydroxide, and alkaline rare earth metal silicate-aluminate oxide europium doped.

The absorbent material may be any one of sponge rubber, sea sponge, cellulose sponge, natural sponge, low-density polyether sponge, double blown polyester sponge, polyvinyl alcohol (PVA) sponge, polyurethane foam, high density foam, foam rubber, latex foam rubber, NASA foam, miracle foam, evlon foam, viscoelastic foam, high resilience foam, re-bonded foam, closed cell foam, and dry fast foam.

Optionally, the kit further comprises additional pieces of absorbent material, each having an adhesive backing, wherein each of said additional piece of absorbent material is adapted to be adhered on the front surface of said rigid carrier such that each of said absorbent material pieces extends outward from said front surface.

The present specification also discloses a kit for creating a colored shape on a surface comprising: at least one stamping device, comprising a rigid carrier having a front surface and a back surface and an absorbent material adhered to the front surface, the absorbent material being shaped into a predefined form and being adhered such that it extends outward from the front surface, thereby creating a raised pattern; a container comprising a liquid material; and, a tray having a top periphery and a base defining a recessed area.

Optionally, said container of liquid material is configured to fit within the recessed area of said tray. Optionally, said stamping device has a periphery that is configured to fit within the top periphery of said tray.

The back surface of said rigid carrier may comprise a pre-fixed handle for manipulating said stamping device. Optionally, the kit further comprises a handle configured to be affixed to said back surface by a user, said handle having a pair of contact portions and a pair of grasping portions and being configurable between a first configuration and a second configuration wherein, when in said first configuration, said handle is designed to lay flat and, when in said second configuration, said contact portions affix to said back surface of said rigid carrier and said grasping portions are configured to be handled by a user.

The absorbent material may be any one of sponge rubber, sea sponge, cellulose sponge, natural sponge, low-density polyether sponge, double blown polyester sponge, polyvinyl alcohol (PVA) sponge, polyurethane foam, high density foam, foam rubber, latex foam rubber, NASA foam, miracle foam, evlon foam, viscoelastic foam, high resilience foam, re-bonded foam, closed cell foam, or dry fast foam.

Optionally, the kit further comprises additional pieces of absorbent material, each having an adhesive backing, wherein each of said additional piece of absorbent material is adapted to be adhered on the front surface of said rigid carrier such that each of said absorbent material pieces extends outward from said front surface.

The present specification also discloses a method for creating a colored shape on a surface comprising the steps of: providing a kit for creating a colored shape on a surface, said kit comprising at least one stamping device, comprising a rigid carrier having a front surface and a back surface and an absorbent material adhered to the front surface, the absorbent material being shaped into a predefined form and being adhered such that it extends outward from the front surface, a powder material and, a tray having a top periphery and a base defining a recessed area; measuring out a desired quantity of said powder material into said recessed area of said tray; adding a predetermined amount of water to said powder material; mixing said powder material with said water to obtain a paint-like mixture; dipping a portion of said absorbent material into said paint-like mixture such that a portion of said paint-like mixture is absorbed into said absorbent material; pressing said absorbent material onto a surface and lifting said absorbent material up such that said absorbent material leaves a mark having said predefined form on said surface.

Optionally, the method described above further comprises the steps of securing a handle to said back surface of said stamping device and using said handle to manipulate said stamping device.

Optionally, the kit further comprises additional pieces of absorbent material, each having an adhesive backing, wherein each of said additional pieces of absorbent material is adapted to be adhered on the front surface of said rigid carrier such that each of said absorbent material pieces extends outward from said front surface, and the method described above further comprises the step of adhering at least one of said additional pieces of absorbent material to said front surface for absorbing said paint-like mixture to create at least one additional mark.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein.

DETAILED DESCRIPTION

The present specification provides a kit for making pre-designed prints on a surface. In an embodiment, the present specification allows for the creation of authentic prints on a desired surface including, but not limited to: paw prints of a plurality of animals such as rabbits, cats, reindeer; prints of images that represent mythological or fictional characters; footprints; or any other type of pre-designed print that can be used to represent a character or holiday. In one embodiment, the kit of the present specification comprises: one or more stamping devices, or stampers, depicting a shape, such as an animal paw; a pre-determined quantity of a solid granular material, such as a powder material, or a predetermined quantity of a liquid; and, a mixing tray. In an embodiment, a user mixes the powder material with water in the mixing tray to obtain a paint-like consistency, dips a portion of the stamper in the paint-like mixture and uses the stamper to create prints on a desired surface by pressing the stamper on the surface and then lifting the stamper up. In another embodiment, a user pours a portion of the liquid in the tray, dips a portion of the stamper in the paint-like mixture and uses the stamper to create prints on a desired surface by pressing the stamper on the surface and then lifting the stamper up. In an embodiment, the stamper is made of an absorbent material, such as a sponge or spongy material, cut out into a desired shape and adhered to a rigid carrier. In an embodiment, one side of the sponge material is adhered to a cardboard backing having a handle built therein, enabling a user to hold the stamper conveniently while dipping in the paint-like mixture and while applying the stamper to marking surfaces.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1A:
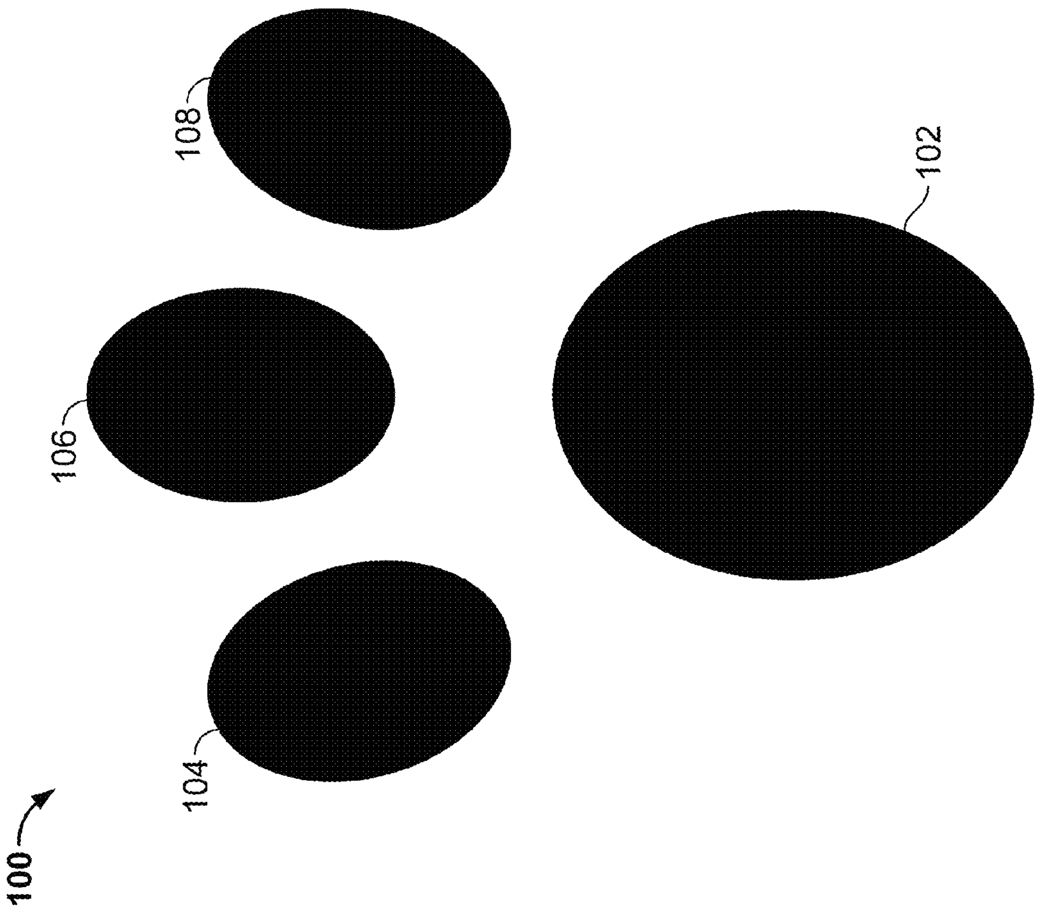
FIG. 1A illustrates a rabbit paw template that is used to make a bunny paw print stamp, in accordance with an embodiment of the present specification.

FIG. 1A illustrates a paw shape of a rabbit that is used to make a rabbit paw print stamper, in accordance with an embodiment of the present specification. As shown in FIG. 1A, a paw print template 100 comprises a print of a rabbit foot sole 102 and three rabbit toe prints 104, 106, and 108 disjointed with one another. In an embodiment, the paw print template 100 is printed on a rigid or stiff material such as cardboard. In an embodiment, the paw print template 100 is printed on a sheet of paper having a cardboard backing. In other embodiments, the paw print template 100 may be made on any rigid material such as a plastic sheet, a metallic sheet, or a hardened rubber sheet.

Figure 1B:
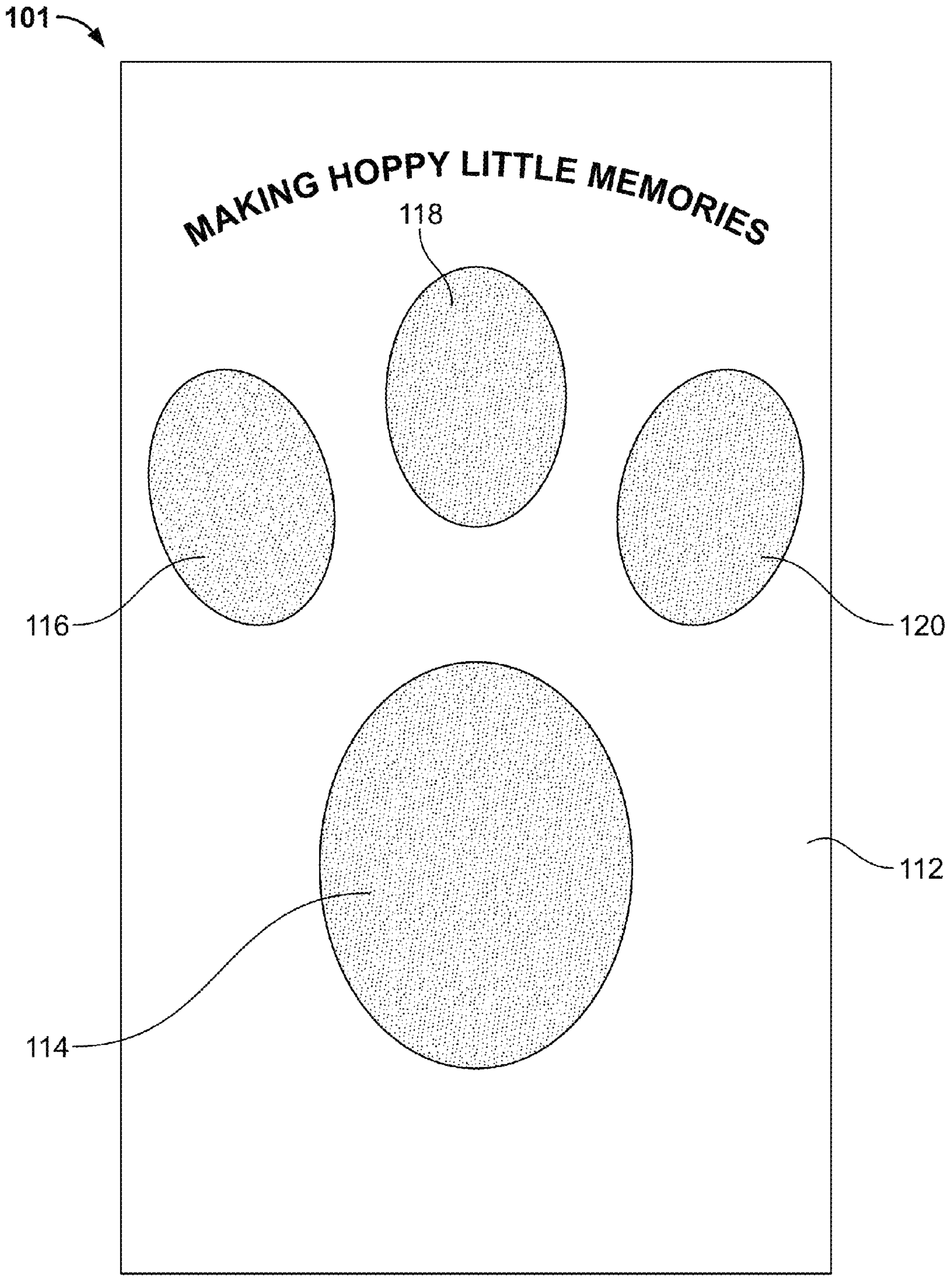
FIG. 1B illustrates a rabbit paw print stamp, in accordance with an embodiment of the present specification.

In an embodiment, pieces of a soft absorbent material, such as a sponge, are cut in accordance with paw print template 100 and adhered to sole print 102 and the three toe prints 104, 106, and 108 in order to create a rabbit paw stamper. FIG. 1B illustrates a rabbit paw stamper 101, in accordance with an embodiment of the present specification. As shown in FIG. 1B, the rabbit paw stamper 101 comprises a plurality of sponge pieces 114, 116, 118, 120 adhered over a backing material 112 in a shape that depicts a paw print of a rabbit, in accordance with template 100 of FIG. 1A. A sponge piece 114 corresponds to sole print 102 of FIG. 1A and sponge pieces 116, 118, and 120 correspond to the three toe prints 104, 106 and 108 of FIG. 1A respectively.

In an embodiment, backing material 112 is a cardboard sheet. In other embodiments, various other rigid materials such as plastic, metals, metal alloys, or hardened rubber may be used for making backing material 112. The backing may be made of any size or dimension. In one embodiment, the size and dimensions of the backing are dependent upon the stamper that is being manufactured. In some embodiments, the stamper size correlates to the size of the print that is being manufactured. In some embodiments, the stamper size is equal to that of a "life-like" representation of the print. For example, in one embodiment, a backing and stamper are sufficiently sized to accommodate one or more boot prints representing Santa Claus's boot prints.

In various embodiments, a sponge or spongy material is used for making the stampers provided by the present specification. For purposes of this specification, a spongy material is any material that is sufficiently absorbent such that it is capable of absorbing liquids and, when compressed, releasing a substantial percentage of the originally absorbed liquid. In various embodiments, a plurality of types of spongy materials may be used such as, but not limited to, neoprene, sponge rubber, sea sponge, cellulose sponge, natural sponge, low-density polyether sponge, double blown polyester sponge, polyvinyl alcohol (PVA) sponge, polyurethane foam, high density foam, foam rubber, latex foam rubber, NASA foam, miracle foam, evlon foam, viscoelastic foam, high resilience foam, re-bonded foam, closed cell foam, and dry fast foam. The term "spongy material" as used in the present specification contemplates the use of, but not limited to, any of the above-mentioned materials or their functional equivalents so as to achieve the objectives described in the present specification and thus, is not to be construed as limiting.

In order to obtain desired prints on a surface, sponge pieces are formed or cut in predefined shapes, optionally mounted to a backing with a handle, and then dipped in a liquid or suspension that leaves behind a mark upon drying.

In an embodiment, the liquid or suspension is made from a powder material such as calcium carbonate powder that readily dissolves in water and leaves clear bright white marks upon drying. In various embodiments other suitable material such as limestone powder, talcum powder, plaster of Paris, flour, powdered sugar, magnesium carbonate, magnesium silicate, calcium sulphate, calcium hydroxide, colored or white paint powders, or tempura paint powders may be used as a material for making prints on a surface using the stampers provided by the present specification. In one embodiment, the liquid or suspension is made from a powder material comprising alkaline rare earth metal silicate-aluminate oxide europium doped, which is a raw glow pigment, allowing for all prints made from said liquid or suspension to glow in the dark. In an embodiment, liquid tempura paint or any other variety of paint may be used in place of powder material for making prints. In optional embodiments, material may also comprise a liquid that does not require any pre-treatment or mixing. In optional embodiments, the resultant material that is used for making the prints is glow-in-the-dark. Optionally, in some embodiments, a stamper kit includes one or more colored powder materials, liquids, or other materials for creating prints. For example, in various embodiments, a tooth fairy wings kit includes glitter added to the powder to simulate fairy dust, a scary cat kit includes neon orange and glow-in-the-dark powder or liquid, a leprechaun print includes green powder or liquid, and other themed kits include powders or liquids appropriately colored as commonly associated with a given theme.

Figure 1C:
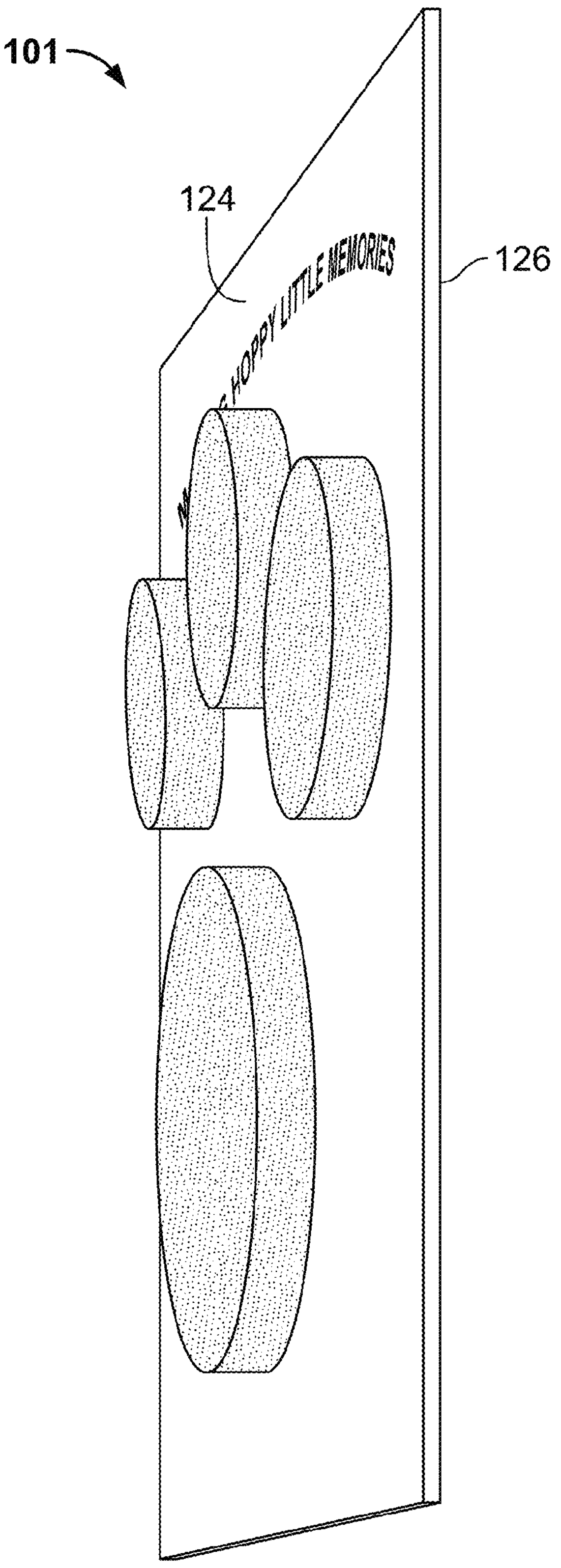
FIG. 1C illustrates another view of the rabbit paw print stamp of FIG. 1B, in accordance with an embodiment of the present specification.

FIG. 1C illustrates another view of the rabbit paw stamper, in accordance with an embodiment of the present specification. Rabbit paw stamper 101 comprises a front side or front surface 124 and a back side or back surface 126. Referring to FIGS. 1B and 1C simultaneously, in an embodiment, sponge pieces 114, 116, 118, and 120 are adhered to the front surface 124 of backing material 112, depicting a rabbit paw shape. The sponge pieces 114, 116, 118, and 120 protrude outwards in a direction perpendicular to the plane of the backing material 112 as shown in FIGS. 1B and 1C. This enables easy dipping of the pieces in a liquid or suspension for making prints on a surface without wetting backing material 112. If the backing is incidentally wetted, it makes obtaining a clean print—one where only the protruding spongy material contains the liquid coloring material—more difficult. Backing material 112 also prevents a user's hands from becoming soiled while using stamper 101.

Figure 1D:
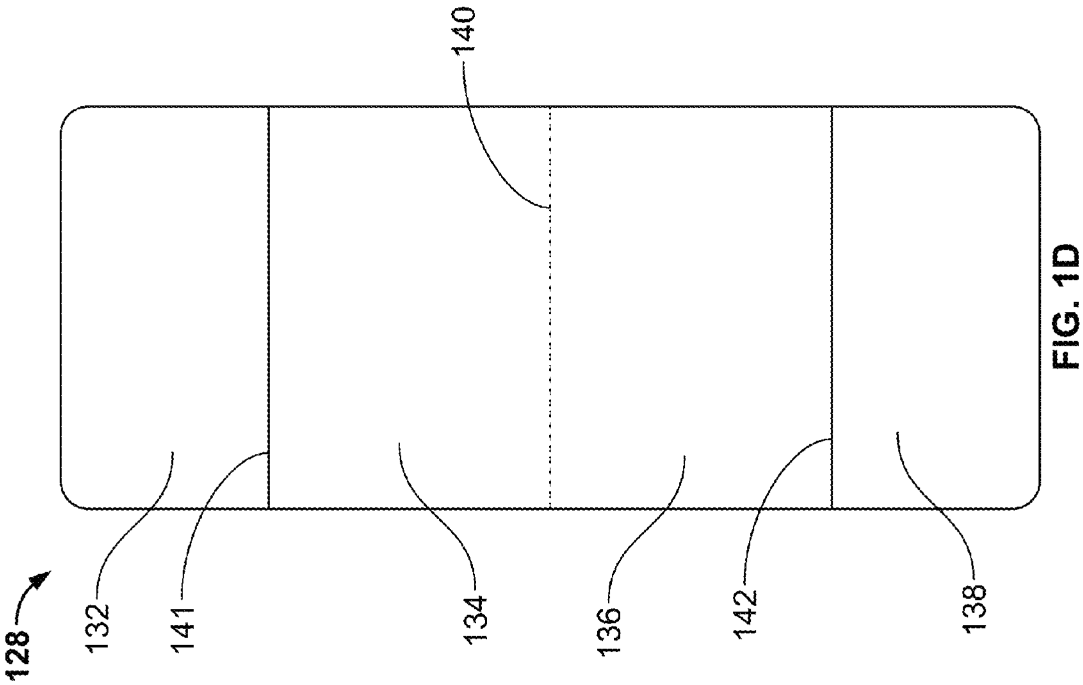
FIG. 1D illustrates an unfolded handle for a stamper, in accordance with an embodiment of the present specification.

FIG. 1D illustrates an unfolded handle 128 for a stamper, in accordance with an embodiment of the present specification. The handle 128 includes a first contact portion 132 at a first end of the handle 128 and a second contact portion 138 at a second end of the handle 128 opposite said first end. Positioned in between said first and second contact portions 132, 138 are first and second grasping portions 134, 136 separated by a center line 140. While substantially rigid within each of said portions 132, 134, 136, 138, the handle 128 can be folded at a first junction 141 between said first contact portion 132 and said first grasping portion 134, at a second junction 142 between said second contact portion 136 and said second grasping portion 138, and at said center line 140. The handle 128 is packaged within a stamper kit box in the unfolded configuration depicted in FIG. 1D to maximize space saving within said stamper kit box. The handle 128 can then be easily folded and secured to the stamper for manipulation of the stamper by a user.

Figure 1E:
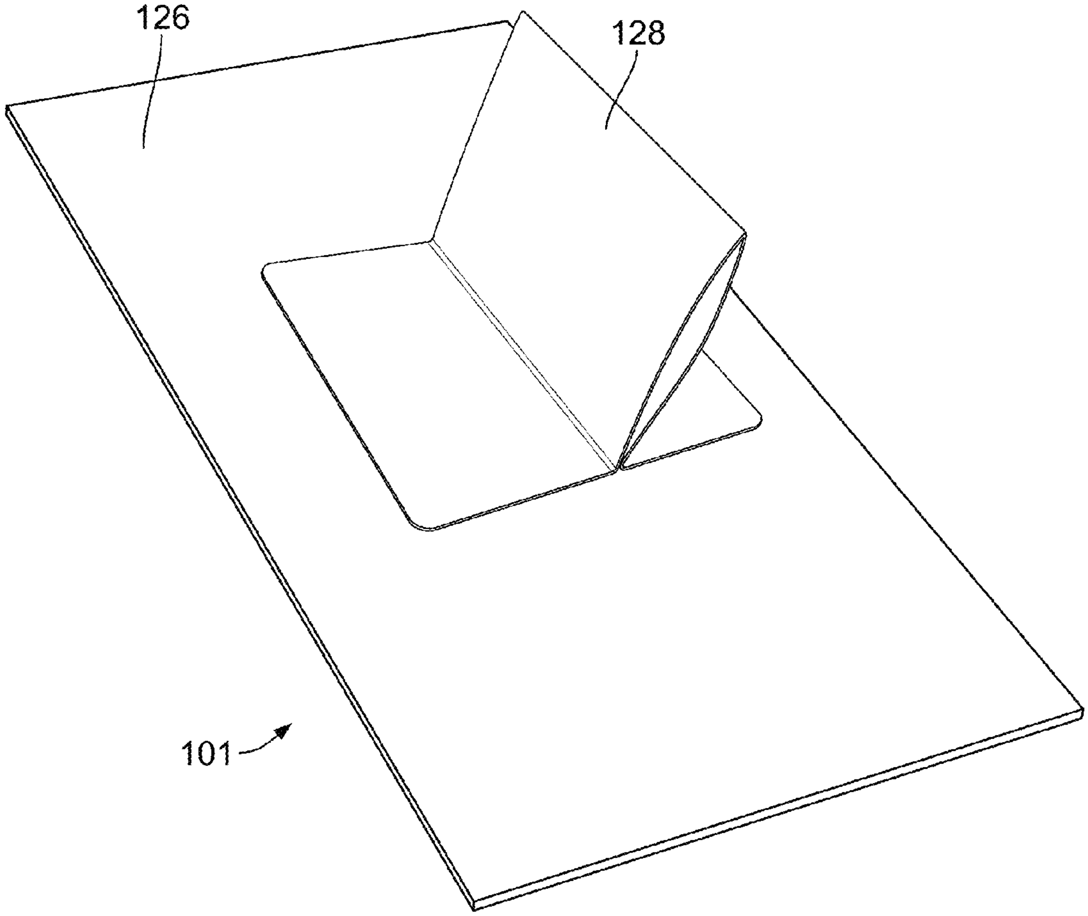
FIG. 1E illustrates a folded handle affixed to a back surface of a stamper, in accordance with an embodiment of the present specification.

One same-facing side of each of the contact portions 132, 138 is covered with an adhesive which in turn, is covered by a strip of paper which is designed to be peeled away to expose said adhesive. To affix the handle 128 to the back surface of a stamper, the user first folds the handle 128 along the center line such that the sides of each contact portion 132, 138 containing the adhesive face one another. The user then folds each contact portion 132, 138 back such that the handle 128 approximates a 'T' shape (as seen in FIG. 1E) wherein the top bar of the 'T' includes the contact portions 132, 138 with their adhesive sides facing up. The user then removes the strips of paper covering each contact portion 132, 138 and affixes said contact portions 132, 138 to the back surface of the stamper by applying light pressure, thereby securing said handle 128 to said stamper.

FIG. 1E illustrates a folded handle 128 affixed to a back surface 126 of a stamper 101, in accordance with an embodiment of the present specification. The handle 128 has been folded and secured to the back surface 126 of the stamper 101 as described above. In its folded configuration affixed to the back surface 126 of the stamper 101, the handle 128 provides a suitable mechanism for manipulating the stamper 101 during use, including dipping in the paint-like mixture and while applying the stamper to marking surfaces. In various embodiments, more than one handle may be affixed to the stamper in the above described manner. In another embodiment, at least one handle is pre-fixed to the back surface of stamper. In various embodiments, the handles may be made of any suitable material that can be attached to the backing material. In other embodiments, the pair of handles may be of semicircular shape having a gap within an outer periphery, enabling a user to grasp the handles firmly through the gap. In various embodiments, the handles may be made of any convenient shape. Further, even though back surface 126 comprising handle 128 is described in conjunction with the rabbit paw stamper, it would be appreciated that any of the stampers provided by the present specification may have a back surface comprising one or more handles.

The kit of the present specification includes a material, whether in powder or liquid form, into which the stamper with the spongy material is dipped to create pre-designed prints on a surface. In one embodiment, the material is a powder which is mixed with water to obtain a colored liquid, such as white, black, red, blue, or any other color. In various embodiments, in order to use the rabbit paw stamper 101 of FIGS. 1B-1C to make paw prints on a surface, front surface 124 is dipped in the colored liquid, such that at least a top surface of the plurality of sponge pieces 114, 116, 118, and 120 is completely covered and/or saturated with the colored liquid. In an embodiment, stamper 101 may be held by using a handle provided on back surface 126 of backing material 112 while dipping the spongy material 114, 116, 118, and 120 into the liquid material. Once the spongy pieces have been dipped in the material, the stamper 101 may be used for making prints on a surface by first pressing the front surface 124 onto the surface and then lifting the stamper 101 up from the surface. In various embodiments, the stamper 101 may be used to make a plurality of prints in quick succession by pressing and lifting the front surface 124 on a surface a plurality of times. In some embodiments, multiple paw prints may be obtained by dipping the front surface 124 in the colored liquid only once.

Figure 2:
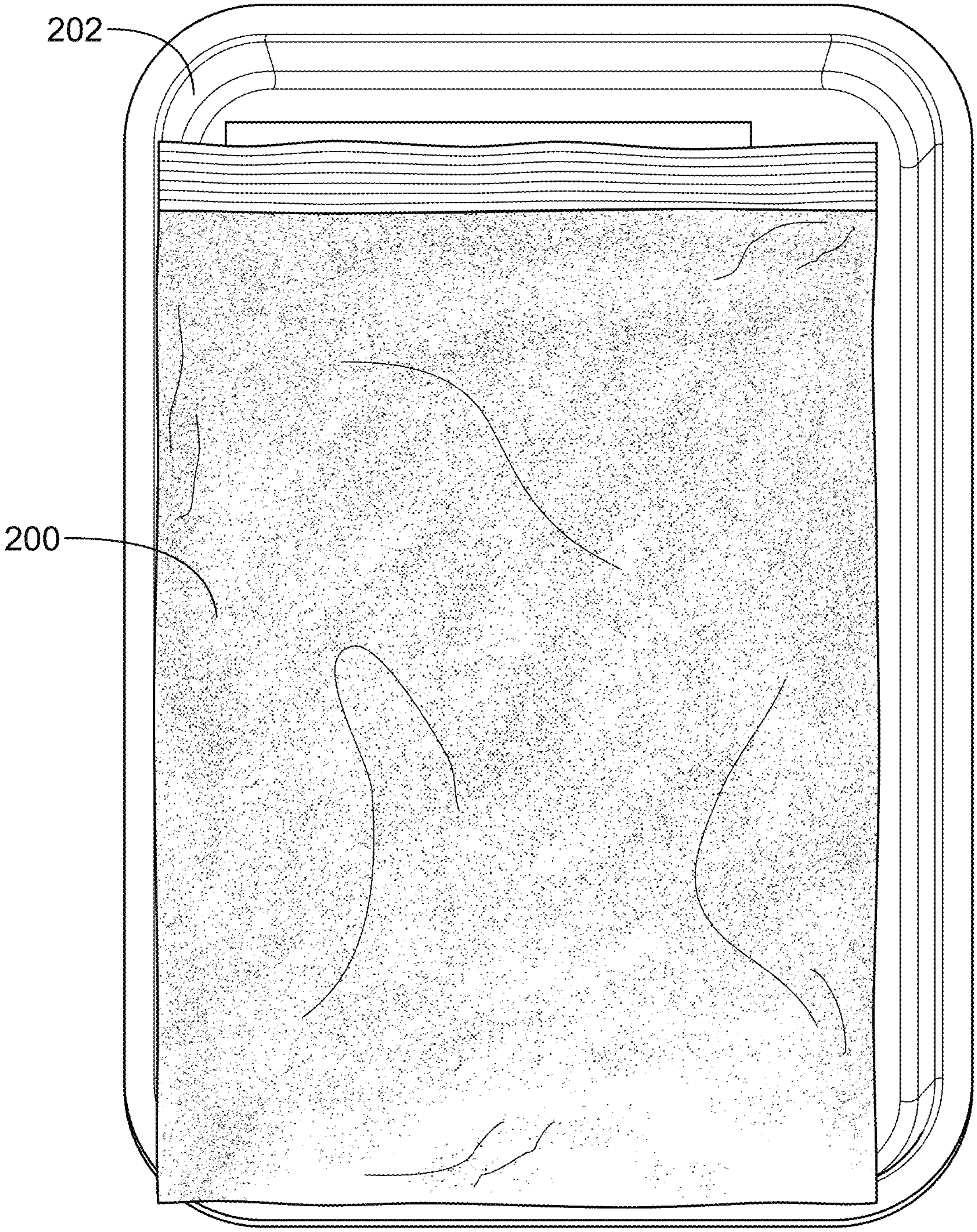
FIG. 2 illustrates a powder material and a mixing tray provided with a kit for making pre-designed prints on a surface, in accordance with an embodiment of the present specification.

FIG. 2 illustrates a powder material 200 and a mixing tray 202 provided with a kit in accordance with an embodiment of the present specification. The powder material 200 is provided within a sealed bag made of any suitable non-absorbent material such as plastic. In various embodiments, the mixing tray 202 is made of a non-absorbent material such as plastic, metal, metal alloy, thermocol, or rubber. The mixing tray 202 is designed to have dimensions suitable enough to allow a user to conveniently mix the entire quantity of powder material 200 with water into an evenly distributed color consistency therein. For example, in one embodiment, the powder material 200 comprises one quarter cup calcium carbonate or any other powder or pigment and it is mixed with approximately one third cup water to create an evenly distributed color mixture.

In an embodiment, the powder material 200 is calcium carbonate powder which readily dissolves in water and leaves clear bright white marks upon drying. In various embodiments, other suitable materials such as limestone powder, talcum powder, plaster of Paris, flour, powdered sugar, magnesium carbonate, magnesium silicate, calcium sulphate, calcium hydroxide, colored or white paint powders, or tempura paint powders may be used as the powder material 200 for making prints on a surface by using the stampers provided by the present specification.

In optional embodiments, the powder material may rather be a liquid that does not require any pre-treatment or mixing. In optional embodiments, the resultant material that is used for making the prints is glow-in-the-dark. In an embodiment, tempura paint or any other variety of paint may be used in place of powder material for making prints on a surface using the sponge stamps of the present specification. It should be understood that the materials selected for the kit are packaged accordingly. For example, a liquid material may be packaged in a bottle or other leak-proof container.

Figure 3A:
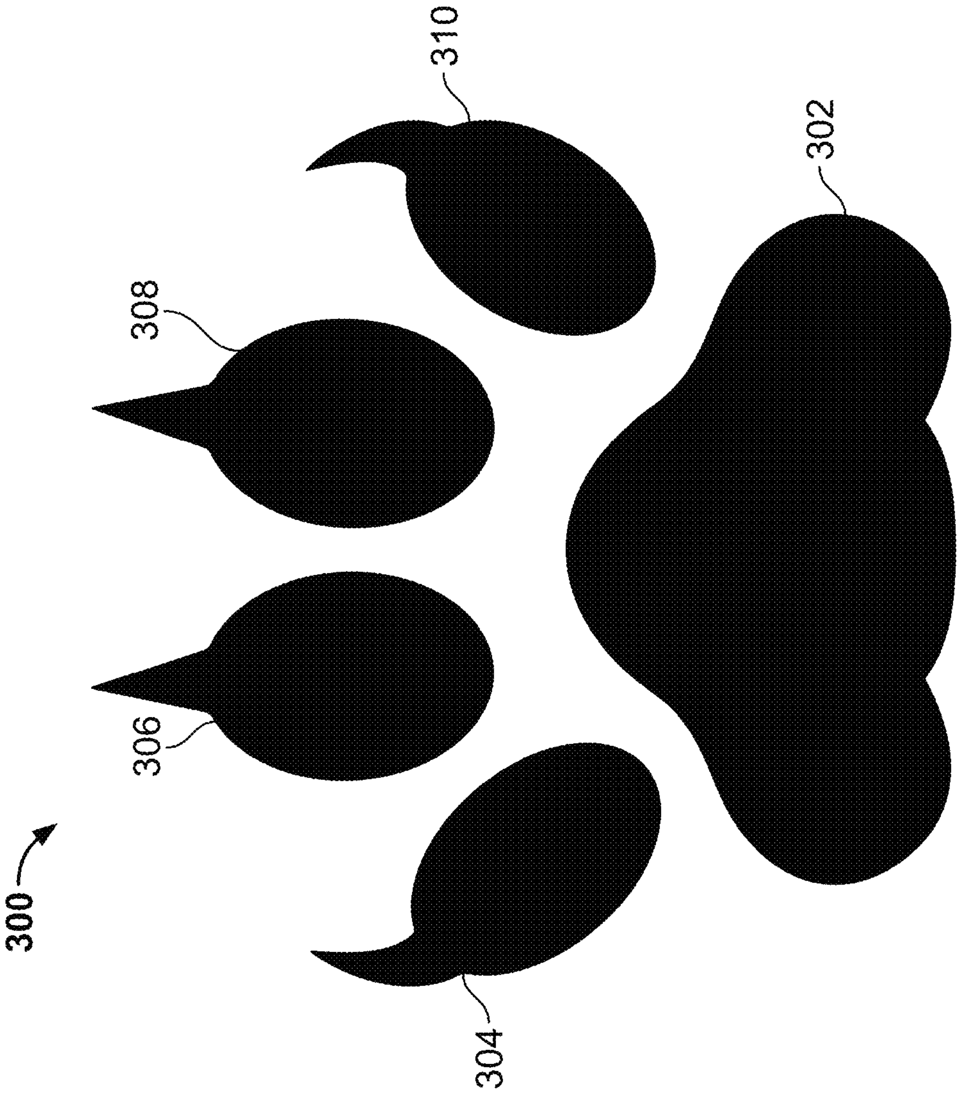
FIG. 3A illustrates a cat paw template that is used to make a cat paw print stamp, in accordance with an embodiment of the present specification.

FIG. 3A illustrates a cat paw stamper template 300, in accordance with an embodiment of the present specification. As shown in the figure, the cat paw template 300 comprises a sole print 302 and three toe prints 304, 306, 308 and 310 disjointed with one another. In some embodiments, the cat paw print can be altered in any way so that it is whimsical, life-like, or scary.

Figure 3B:
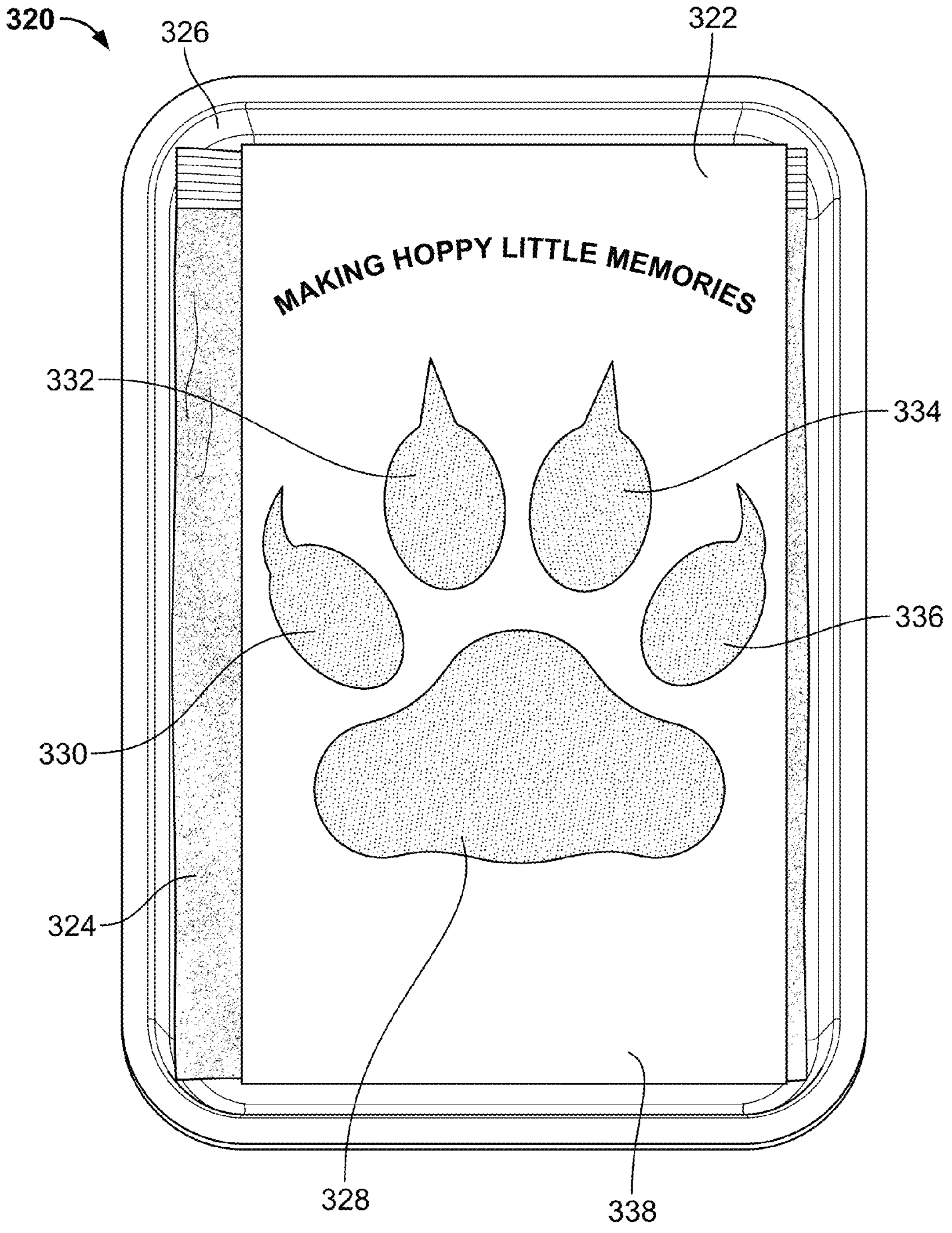
FIG. 3B illustrates a cat paw print stamp kit in accordance with an embodiment of the present specification.

FIG. 3B illustrates a cat paw stamper kit 320 in accordance with an embodiment of the present specification. The kit 320 comprises a cat paw stamper 322, a powder material 324 and a mixing tray 326. The cat paw stamper 322 comprises sponge pieces 328, 330, 332, 334 and 336 depicting a cat paw shape adhered to a backing material 338. The spongy pieces 328, 330, 332, 334 and 336 protrude outwards in a direction perpendicular to the plane of the backing material 338. The powder material 324 is contained in a sealed plastic bag (shown as 325 in FIGS. 3C and 3D) which is cut open before use. In an embodiment, when packaged, both the sealed plastic bag comprising the powder material 324 and the cat paw stamper 322 are configured to fit within a recessed area of the tray 326. In another embodiment, when packaged, the sealed plastic bag comprising the powder material 324 is configure to fit within a recessed area of the tray 326 and the cat paw stamper 322 has a periphery configured to fit within a top periphery of the tray 326.

Figure 3C:
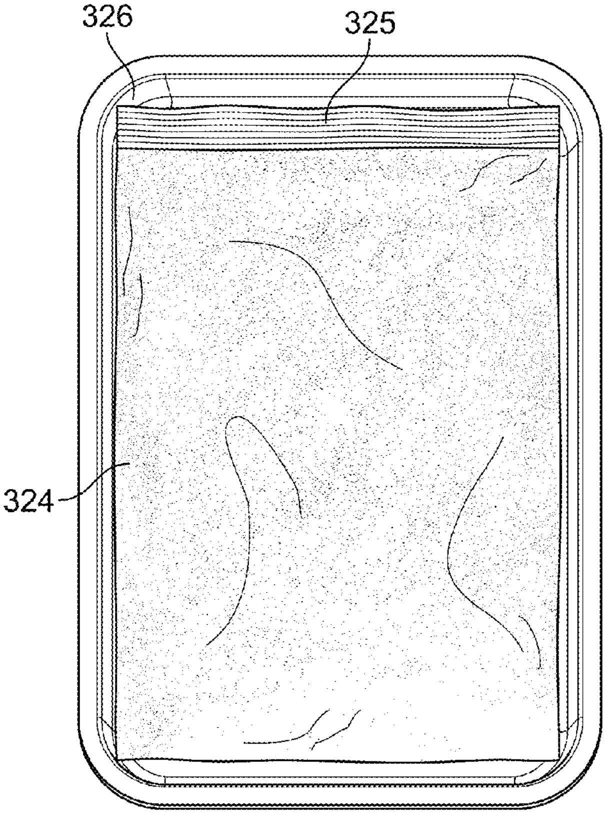
FIG. 3C illustrates a mixing tray and powder package as contained in a stamper kit, in accordance with an embodiment of the present specification.

FIG. 3C illustrates a mixing tray 326 and powder material 324 within a bag 325 removed from a cat paw stamper kit. The powder material 324 is provided within a sealed bag 325 made of any suitable non-absorbent material such as plastic. The mixing tray 326 is made of a non-absorbent material such as plastic, metal, metal alloy, thermocol, or rubber.

Figure 3D:
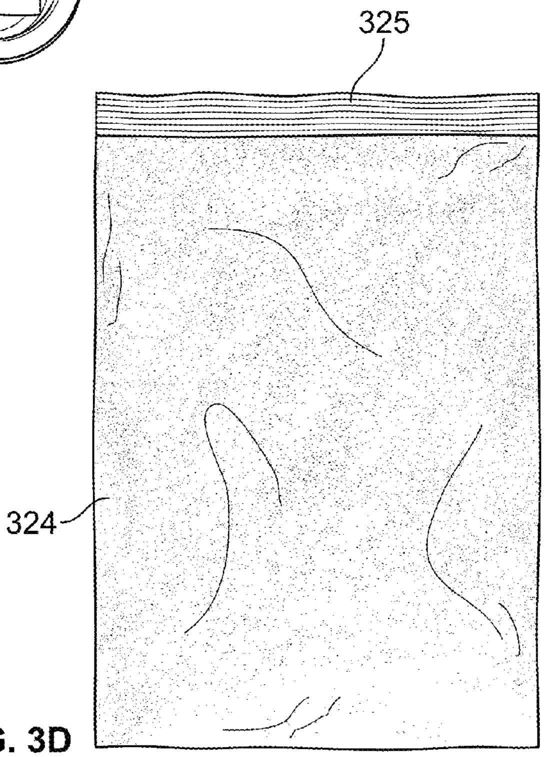
FIG. 3D illustrates a powder package as contained in a stamper kit, in accordance with an embodiment of the present specification.

FIG. 3D illustrates powder material 324 within a bag 325 of a cat paw stamper kit. In one embodiment, the powder material 324, contained within a sealed bag 325, is calcium carbonate powder that readily dissolves in water and leaves clear bright white marks upon drying. In various embodiments, other suitable material such as limestone powder, talcum powder, plaster of Paris, flour, powdered sugar, magnesium carbonate, magnesium silicate, calcium sulphate, calcium hydroxide, colored or white paint powders, or tempura paint powders may be used as material for making prints on a surface by using a stamper of the present specification.

Figure 3E:
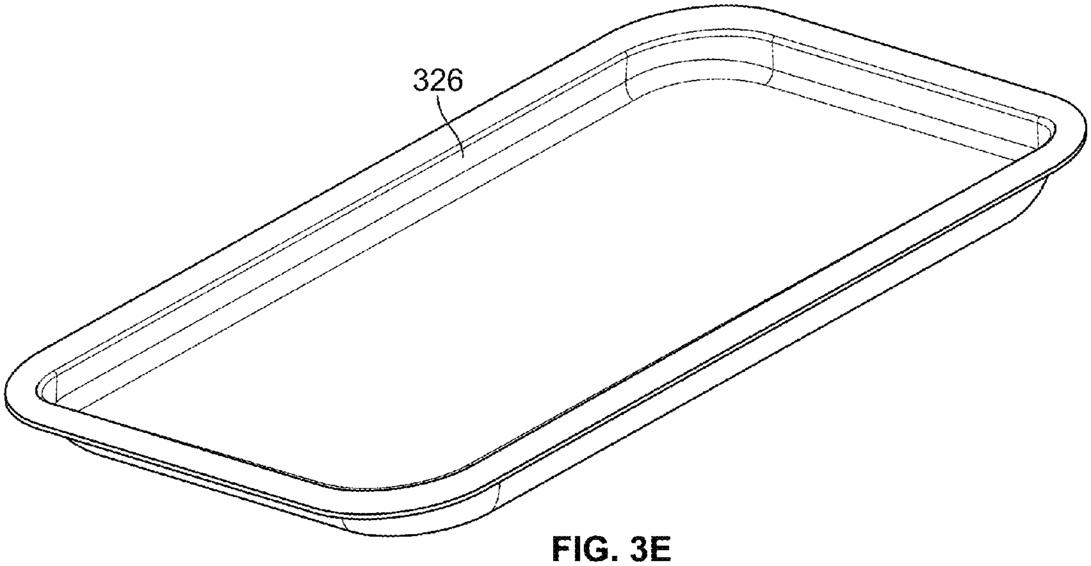
FIG. 3E illustrates a mixing tray as included in a stamper kit, in accordance with an embodiment of the present specification.

FIG. 3E illustrates a mixing tray 326 of a cat paw stamper kit. The mixing tray 326 is designed to have dimensions suitable enough to allow a user to conveniently mix the powder material with a liquid such as water therein to obtain a paint-like consistency. The mixing tray 326 has a top periphery and a base defining a recessed area. In an embodiment, the dimensions of the mixing tray 326 are approximately 8¼ inches long, 5¾ inches wide and ½ inch deep.

Figure 3F:
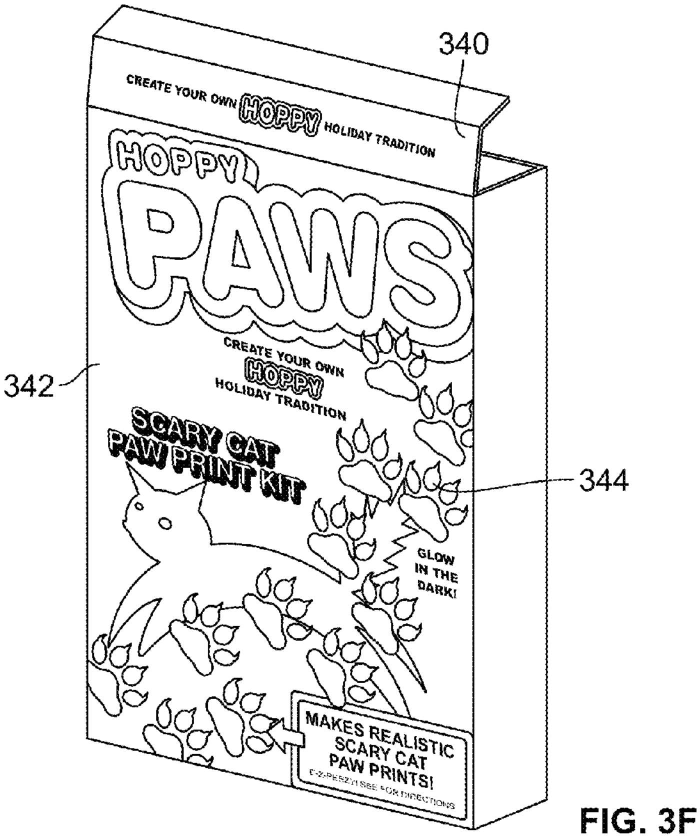
FIG. 3F illustrates a box for packaging a stamper kit, in accordance with an embodiment of the present specification.

FIG. 3F illustrates a box 340 for packaging a cat paw stamper kit of the present specification. The dimensions of box 340 are such to allow a cat stamper kit to be easily contained therein. In an embodiment, the length, width and depth of the box 340 are approximately 8½, 6 and ¾ inches respectively. The box 340 has a front side 342 and an opposing back side. In an embodiment, a picture depicting the cat paw prints 344 that may be made by using the enclosed cat paw stamper kit is illustrated on the front side 342. In an embodiment, the method of using the cat paw stamper kit is printed on the back side of the box 340.

Figure 4A:
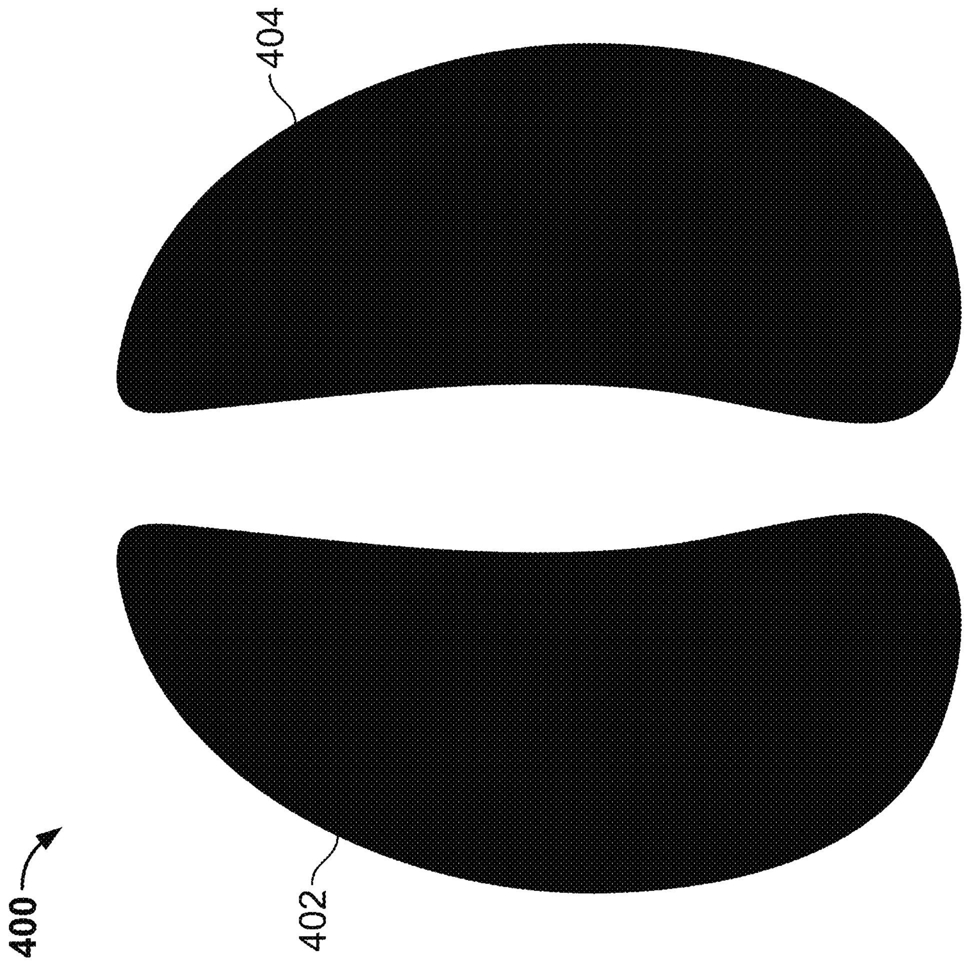
FIG. 4A illustrates a rabbit ear template that is used to make a rabbit ear print stamp, in accordance with an embodiment of the present specification.

FIG. 4A illustrates a rabbit ear template 400 used to make a rabbit ear print stamp, in accordance with an embodiment of the present specification. The rabbit ear template 400 comprises a left ear print 402 and a right ear print 404 disjointed with each other.

Figure 4B:
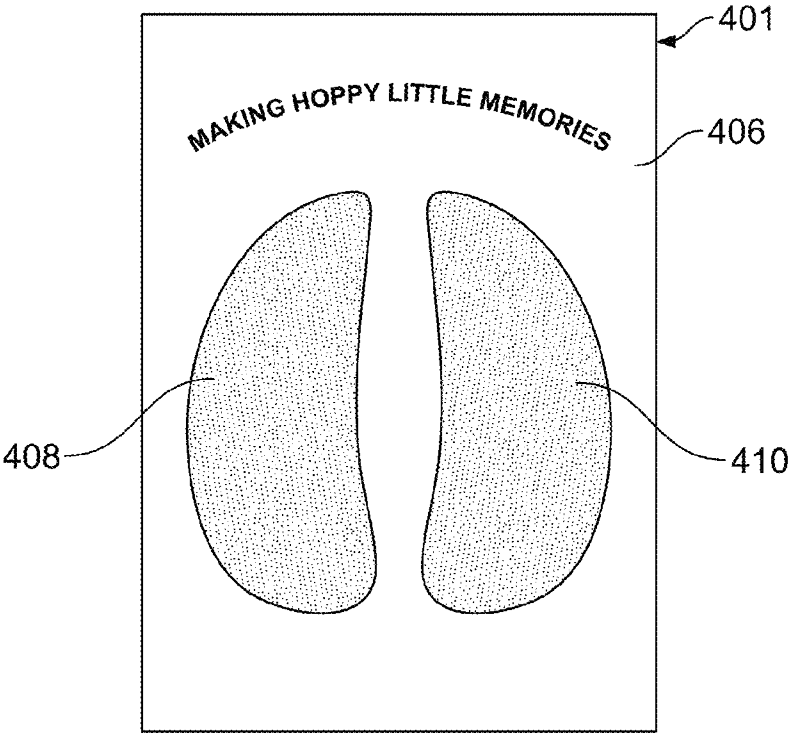
FIG. 4B illustrates a rabbit ear print stamp, in accordance with an embodiment of the present specification.

FIG. 4B illustrates a rabbit ear stamper 401, in accordance with an embodiment of the present specification. As shown in FIG. 4B, the rabbit ear stamper 401 comprises a plurality of sponge pieces 408, 410 adhered over a backing sheet 406 in a shape that depicts ear prints of a rabbit using the template 400 described above with respect to FIG. 4A. A first spongy piece 408 corresponds to the left ear shape 402 of FIG. 4A and a second spongy piece 410 corresponds to the right ear shape 404 of FIG. 4A. In some embodiments, a portion of the first or second sponge pieces may be cut-away and removably attached to the backing so that the end user has the option to create rabbit ear prints with, for example, the center portion removed to represent the inner portion of a rabbits ear.

Figure 5A:
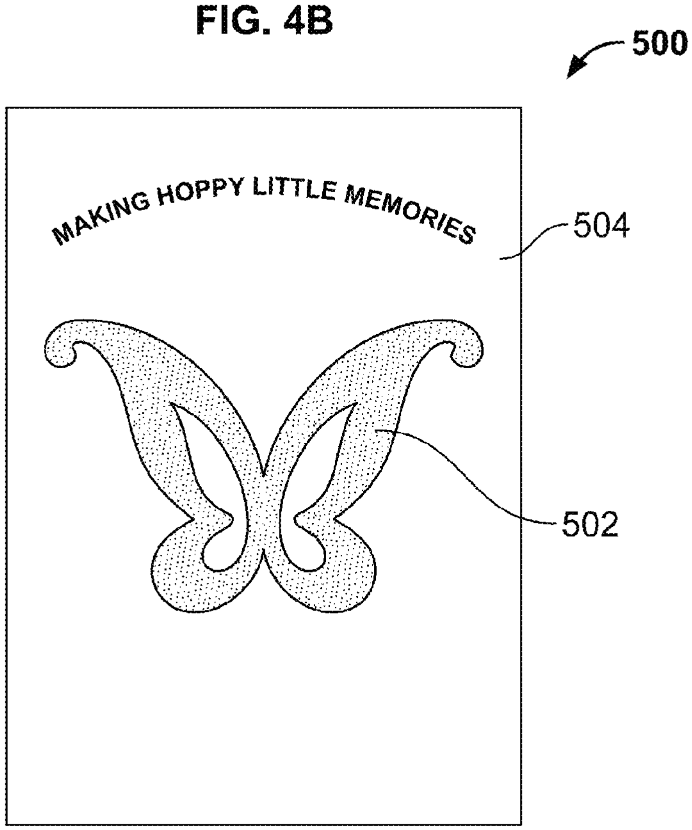
FIG. 5A illustrates a tooth fairy wing print stamp, in accordance with an embodiment of the present specification; and, FIG. 5B illustrates another view of the tooth fairy wing print stamp of FIG. 5A, in accordance with an embodiment of the present specification.
Figure 5B:
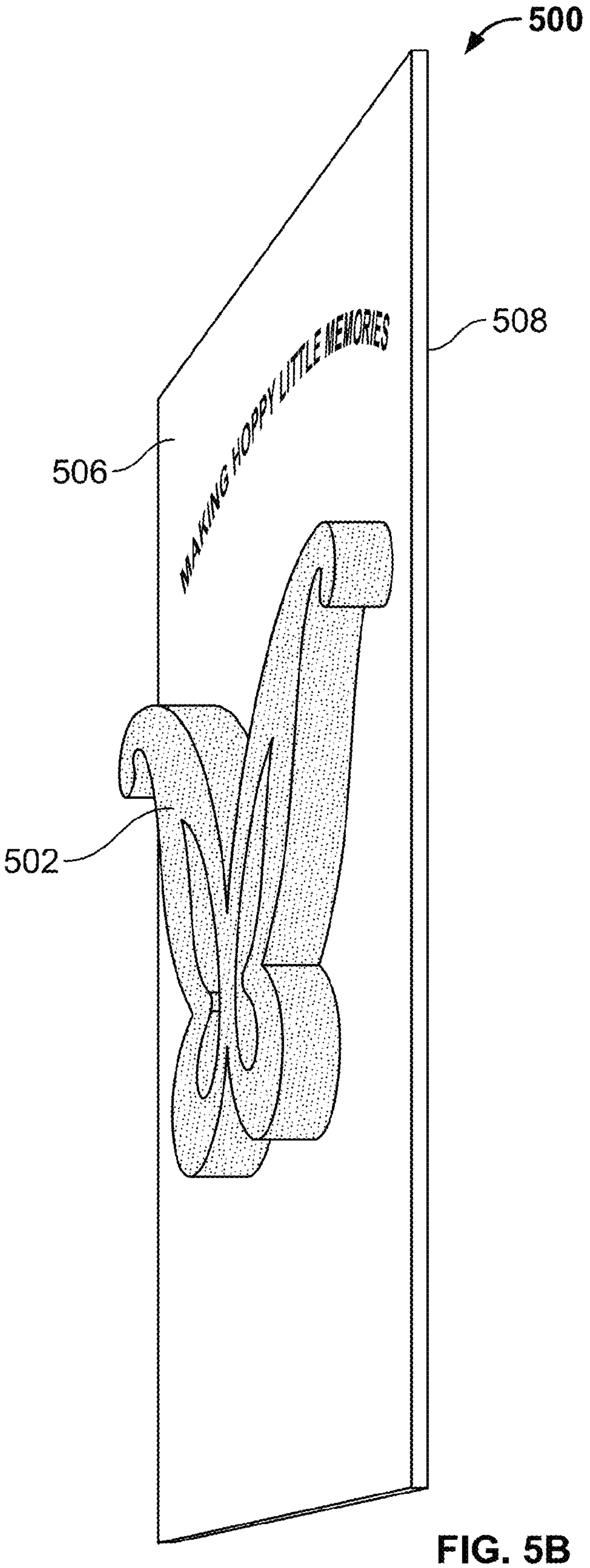

FIG. 5A illustrates a tooth fairy wing stamper 500, in accordance with an embodiment of the present specification. As shown in FIG. 5A, tooth fairy wing print stamper 500 comprises a piece of sponge 502 cut in a shape depicting a fairy's wings adhered over a backing material 504. FIG. 5B illustrates another view of the tooth fairy wing stamper 500 of FIG. 5A, in accordance with an embodiment of the present specification. Tooth fairy wing stamper 500 comprises a front surface 506 and a back surface 508. Referring to FIGS. 5A and 5B simultaneously, in an embodiment, front surface 506 comprises spongy piece 502 adhered to backing material 504 depicting a fairy wing shape. The spongy piece 502 protrudes outwards in a direction perpendicular to the plane of the backing material 504 as shown in FIGS. 5A and 5B. This enables easy dipping of the spongy piece 502 in a liquid material for making prints on a surface without wetting backing material 504. Back surface 508 optionally comprises a handle for easier dipping of the spongy piece 502 into a material.

Figure 6:
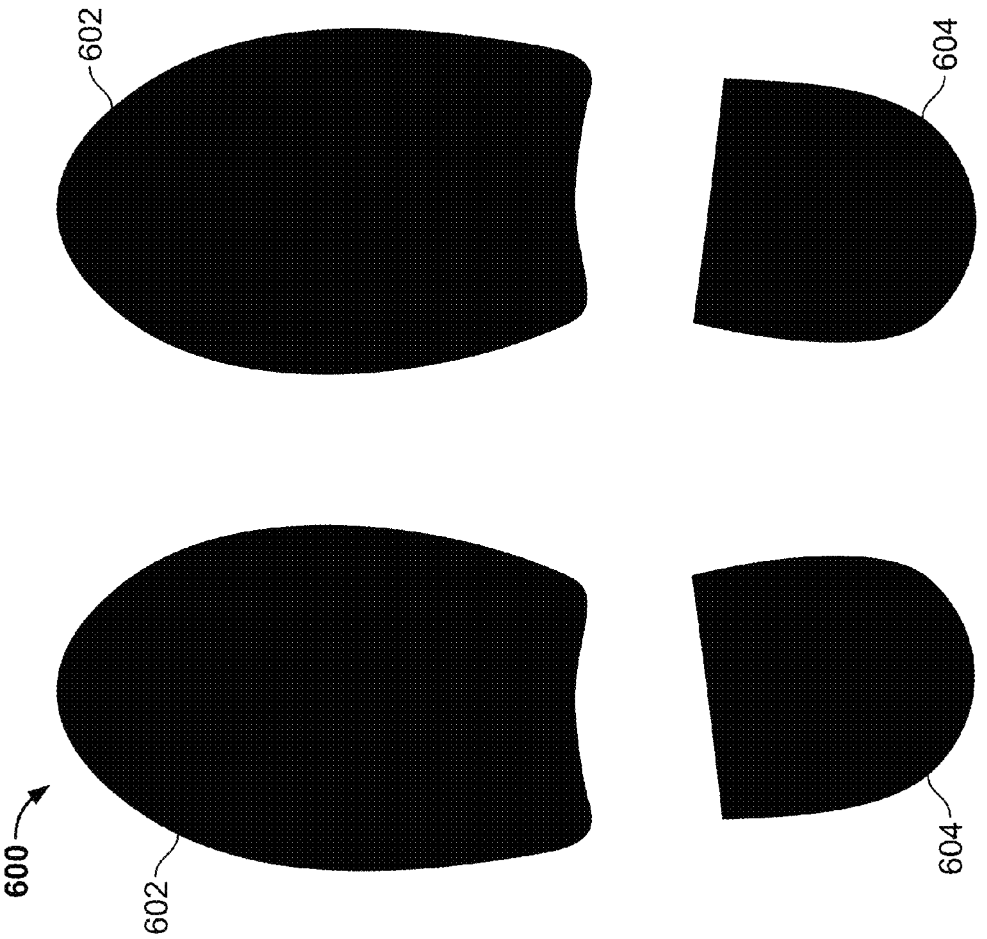
FIG. 6 illustrates a template for a pair of shoes print that is used to make a shoes print stamper, in accordance with an embodiment of the present specification.

FIG. 6 illustrates a template 600 for a pair of shoes print that is used to make a shoe print stamper, in accordance with an embodiment of the present specification. Shoe print template 600 comprises a pair of toe prints 602 and a pair of heel prints 604, wherein prints 602 and 604 are disjointed from one another. In an embodiment, template 600 is printed on a rigid or stiff backing material before spongy pieces conforming to the prints 602 and 604 are adhered thereon. In an embodiment, the shoe print template 600 is printed on a sheet of paper having a cardboard backing. In other embodiments, the shoe print template 600 may be made on any rigid material such as a plastic sheet, a metallic sheet, or a hardened rubber sheet.

Figure 7A:
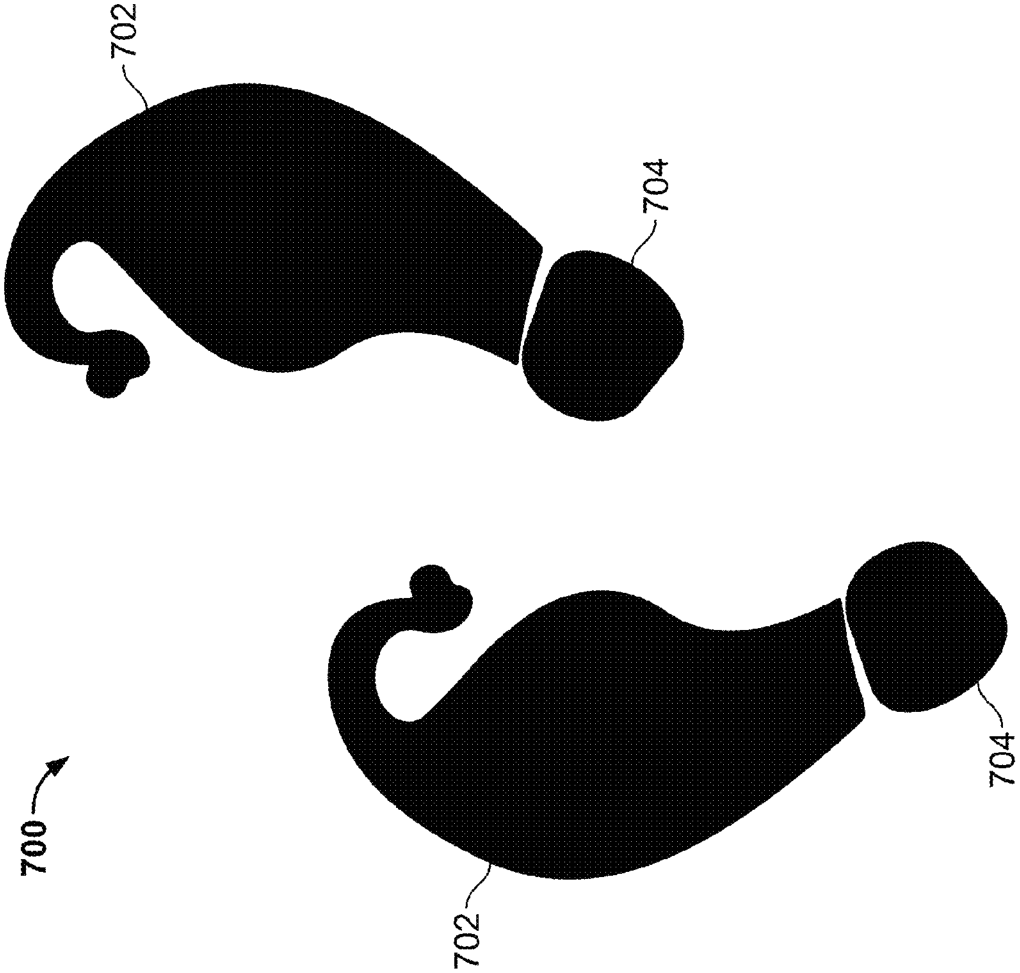
FIG. 7A illustrates a template for a pair of elf shoes print that is used to make an elf shoes print stamper, in accordance with an embodiment of the present specification.

FIG. 7A illustrates a template 700 for a pair of elf shoes print that is used to make an elf shoes print stamper, in accordance with an embodiment of the present specification. Elf shoe print template 700 comprises a pair of toe prints 702 and a pair of heel prints 704, wherein prints 702 and 704 are disjointed from one another. In an embodiment, template 700 is printed on a rigid or stiff backing material before spongy pieces conforming to the prints 702 and 704 are adhered thereon. In an embodiment, template 700 is printed on a sheet of paper having a cardboard backing. In other embodiments, template 700 may be made on any rigid material such as a plastic sheet, a metallic sheet, or a hardened rubber sheet.

Figure 7B:
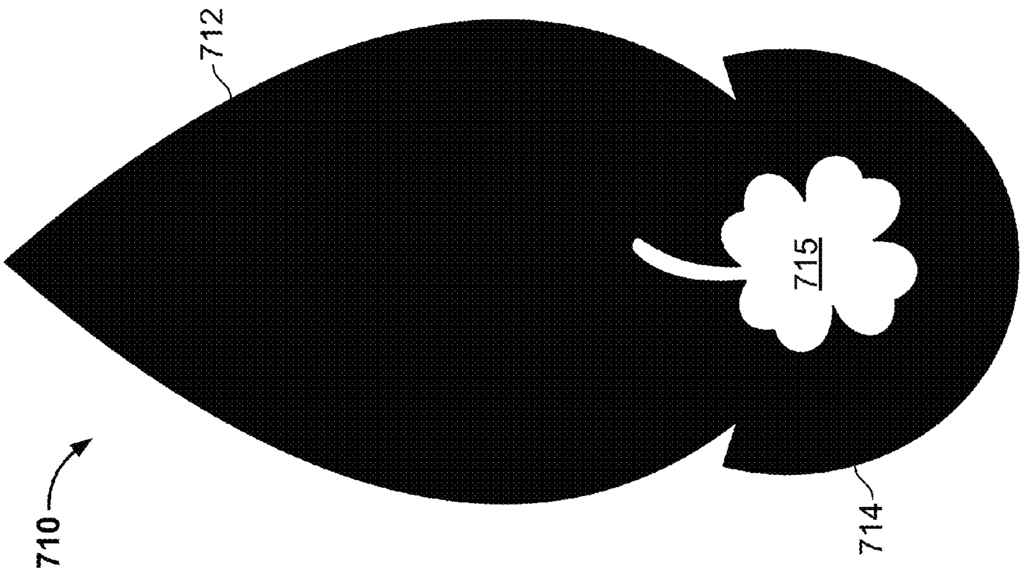
FIG. 7B illustrates a template for a leprechaun shoe print that is used to make a leprechaun shoe print stamper, in accordance with an embodiment of the present specification.

FIG. 7B illustrates a template 710 for a leprechaun shoe print template that is used to make a leprechaun shoe print stamper, in accordance with an embodiment of the present specification. In one embodiment, leprechaun shoe print template 710 comprises a toe print 712 and a heel print 714 disjointed from one another. In another embodiment, leprechaun shoe print template 710 comprises a toe print 712 and a heel print 714 that are joined together. In one embodiment, a cutout 715 in the shape of a four leaf clover is included toward the heel end of the leprechaun shoe print template 710. In an embodiment, template 710 is printed on a rigid or stiff backing material before spongy pieces conforming to the prints 712 and 714 are adhered thereon. In an embodiment, template 710 is printed on a sheet of paper having a cardboard backing. In other embodiments, template 710 may be made on any rigid material such as a plastic sheet, a metallic sheet, or a hardened rubber sheet.

Figure 8:
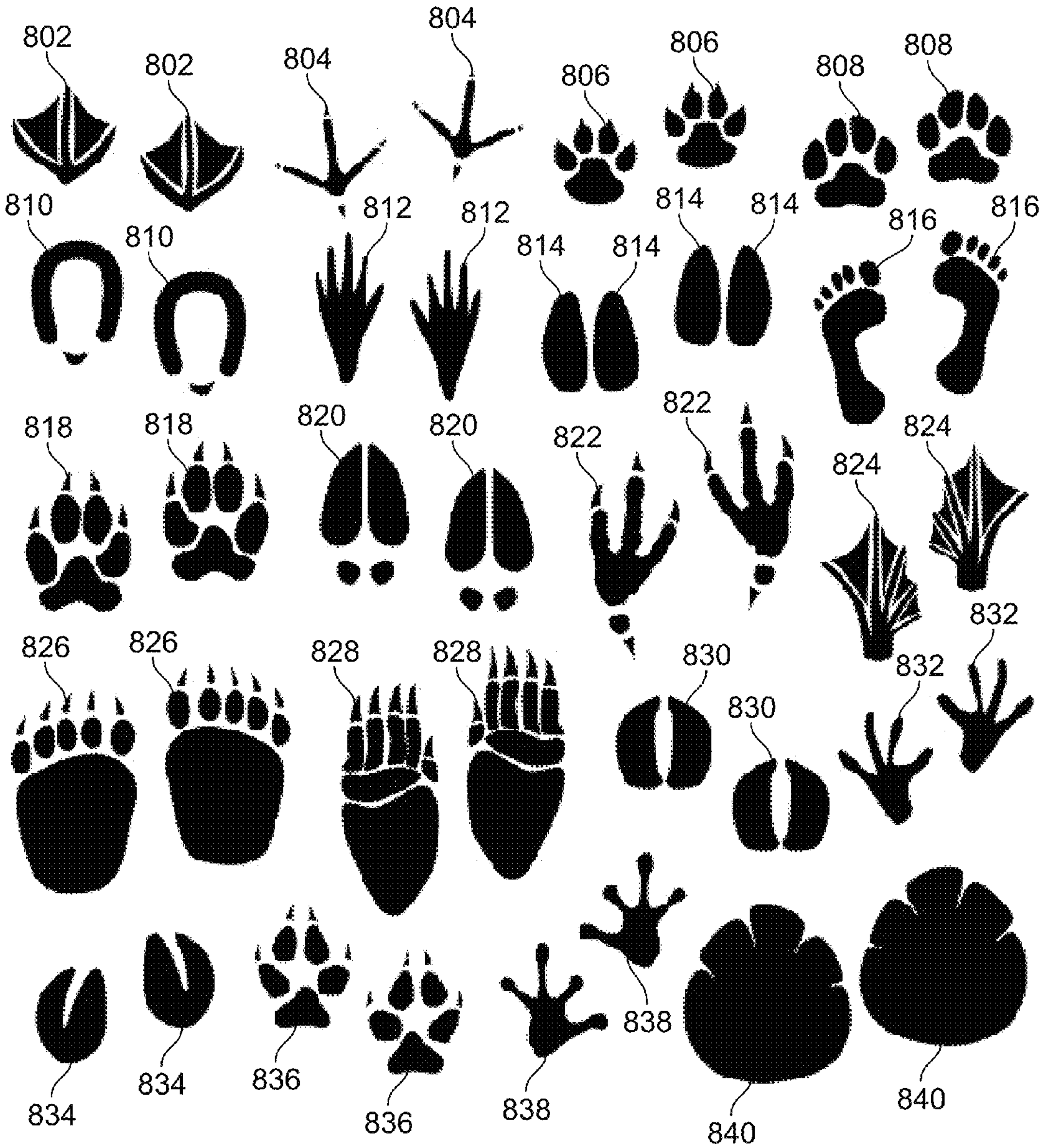
FIG. 8 illustrates a plurality of paw print templates that are used to create various paw print stampers, in accordance with an embodiment of the present specification.

FIG. 8 illustrates a plurality of paw print templates that are used to create various paw print stampers, in accordance with an embodiment of the present specification. Print 802 represents a pair of paw prints of a duck, print 804 represents a pair of paw prints of a stork, print 806 represents a pair of paw prints of a cat, and print 808 represents a pair of paw prints of a dog. Print 810 represents a pair of horseshoe prints, print 812 represents a pair of paw prints of a possum and print 814 represents a pair of paw prints of a reindeer. Print 816 represents a pair of human footprints. Print 818 represents a pair of paw prints of any wild cat while print 820 represents a pair of deer prints. Prints 822, 824, and 826 represent a pair of prints of a bird, a goose, and a bear respectively. Print 828 represent a pair of bear paw prints and print 830 represent a pair of sheep prints. Prints 832, 834, 836, 838, and 840 represent a pair of paw prints of a frog, a goat, a raccoon, a tree frog, and an elephant respectively.

In an embodiment, each of the print templates illustrated in FIG. 8 are printed separately on a rigid or stiff backing material before spongy pieces conforming to the print templates are adhered thereon, to obtain a stamper in accordance with the present specification. In another embodiment, more than one of the print templates shown in FIG. 8 may be printed on the same backing material, and spongy pieces with an adhesive backing conforming to the printed templates may be provided. This enables a user to choose a desired print template and attach the corresponding spongy pieces thereon to create a stamper.

Figure 9:
FIG. 9 illustrates a plurality of templates for human lips prints that are used to make lip print stampers, or an impression of a kiss, in accordance with an embodiment of the present specification.

FIG. 9 illustrates a plurality of templates for human lip prints that are used to make lip print stampers, or an impression of a kiss, in accordance with an embodiment of the present specification. Prints 902, 904 and 906 are used to obtain curvy lip, front facing lip and side facing lip stampers respectively. In an embodiment, each of the print templates illustrated in FIG. 9 are printed separately on a rigid or stiff backing material before spongy pieces conforming to the print templates are adhered thereon, to obtain a stamper in accordance with the present specification. In another embodiment, more than one of the print templates shown in FIG. 9 may be printed on the same backing material, and spongy pieces with an adhesive backing conforming to the printed templates may be provided. This enables a user to choose a desired print template and attach the corresponding spongy pieces thereon to obtain a stamper.

Figure 10:
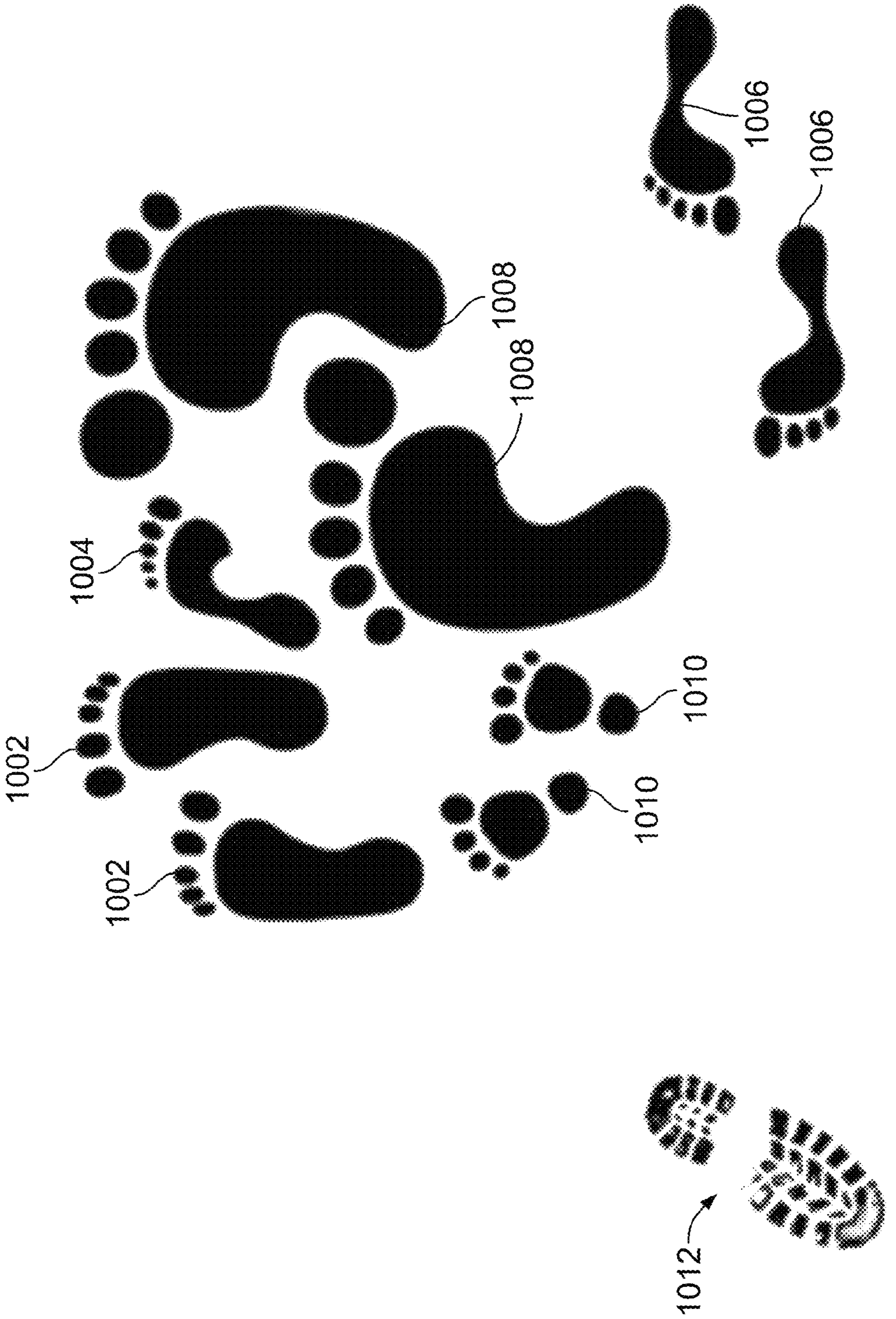
FIG. 10 illustrates a plurality of human footprint templates that are used to make human footprint stampers, in accordance with an embodiment of the present specification.

FIG. 10 illustrates a plurality of human footprint templates that are used to make human footprint stampers, in accordance with an embodiment of the present specification. Prints 1002, 1004, 1006, 1008 and 1010 are used to obtain a pair of straight foot prints, a curvy foot print, a pair of curvy foot prints, a pair of giant foot prints and a pair of baby foot prints respectively. Print 1012 represents a human shoe print template that is used to obtain a shoe print stamper. In an embodiment, each of the print templates illustrated in FIG. 10 are printed separately on a rigid or stiff backing material before spongy pieces conforming to the print templates are adhered thereon, to obtain a stamper in accordance with the present specification. In another embodiment, more than one of the print templates shown in FIG. 10 may be printed on the same backing material, and spongy pieces with an adhesive backing conforming to the printed templates may be provided. This enables a user to choose a desired print template and attach the corresponding spongy pieces thereon to obtain a stamper.

Figure 11:
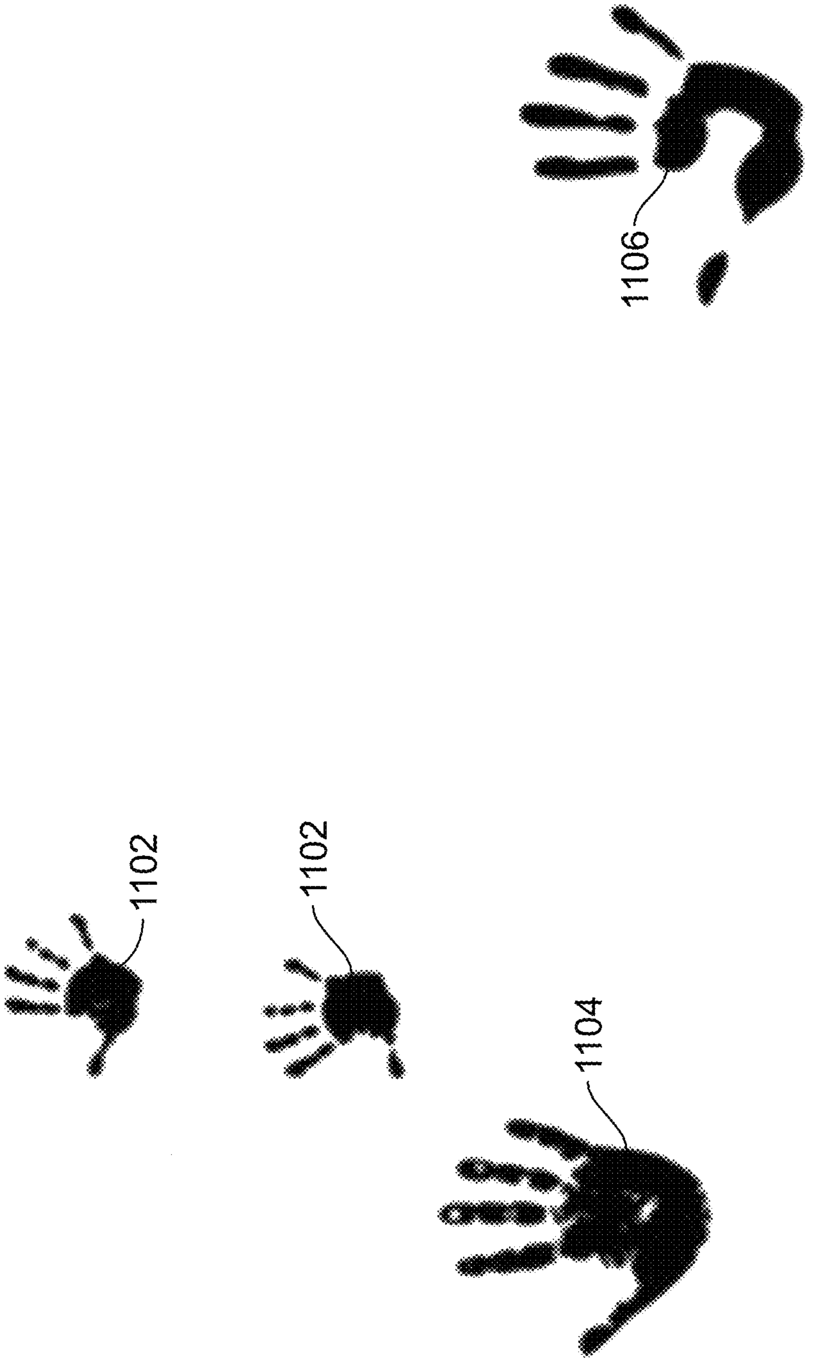
FIG. 11 illustrates a plurality of human handprint templates that are used to make human handprint stampers, in accordance with an embodiment of the present specification.

FIG. 11 illustrates a plurality of human handprint templates that are used to make handprint stampers, in accordance with an embodiment of the present specification. Prints 1102, 1104 and 1106 are used to create stampers of a pair of small hand prints, a first single large hand print and a second single large hand print, respectively. In an embodiment, each of the print templates illustrated in FIG. 11 are printed separately on a rigid or stiff backing material before spongy pieces conforming to the print templates are adhered thereon, to obtain a stamper in accordance with the present specification. In another embodiment, more than one of the print templates shown in FIG. 11 may be printed on the same backing material, and spongy pieces with an adhesive backing conforming to the printed templates may be provided. This enables a user to choose a desired print template and attach the corresponding spongy pieces thereon to obtain a stamper.

In some embodiments, the stamper kit may be used for the creation of authentic prints on a desired surface including, but not limited to: paw prints of a plurality of animals such as rabbits, cats, reindeer; prints of images that represent mythological or fictional characters; footprints; or, any other type of pre-designed print that can be used to represent a character or holiday.

In some embodiments, the stamper kit is housed within a box having a front side and a back side. In an embodiment, a picture depicting the pre-designed prints that may be made by using the stamper kit is illustrated on the front side. In an embodiment, instructions for using the stamper kit are provided on the back side of the box.

Figure 12:
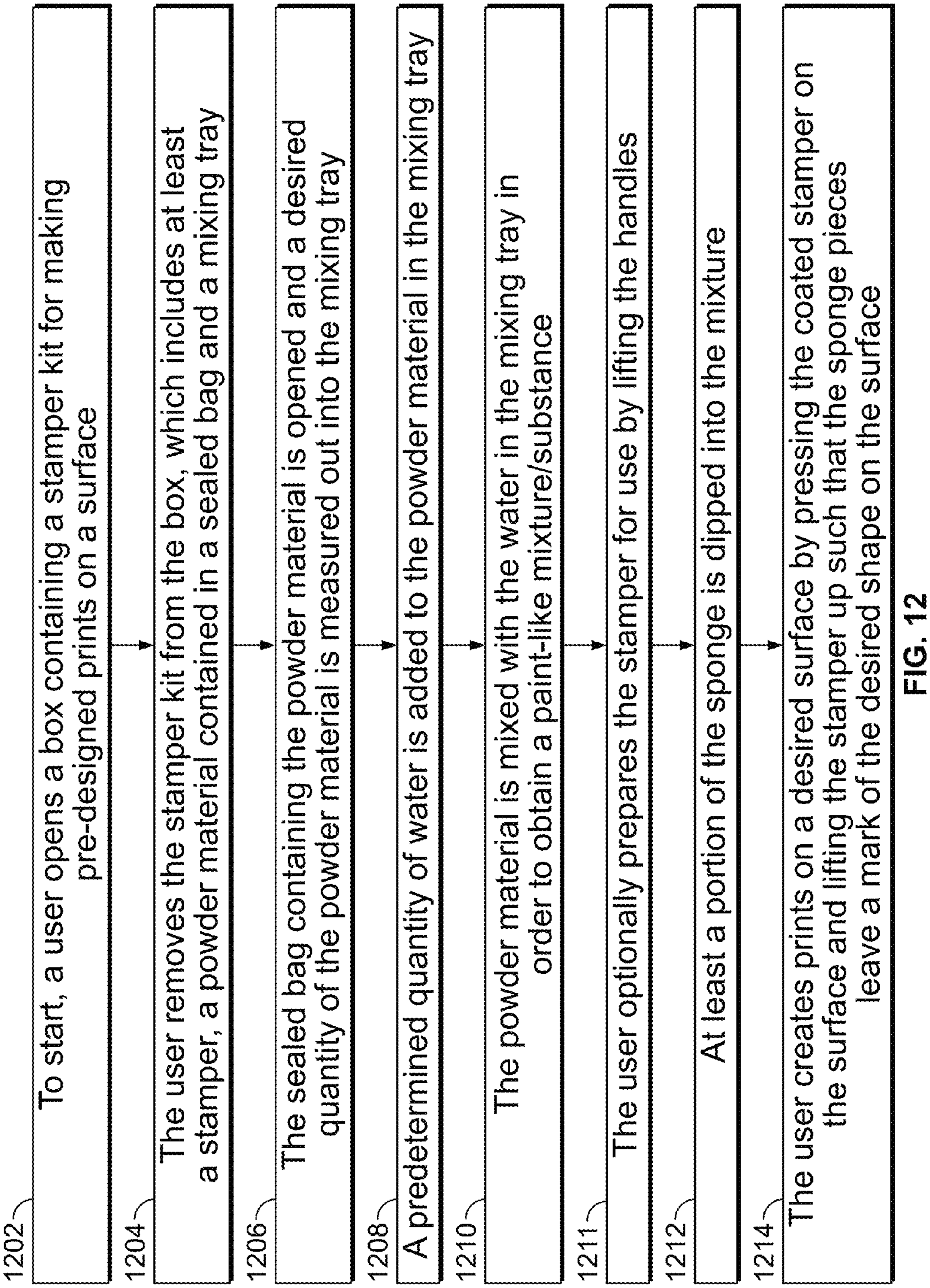
FIG. 12 is a flowchart illustrating a method of using a stamper kit, in accordance with an embodiment of the present specification.

FIG. 12 is a flowchart illustrating a method of using a stamper kit, in accordance with an embodiment of the present specification. At step 1202, a user opens a box containing a stamper kit for making pre-designed prints on a surface. At step 1204, the user removes the stamper kit from the box, which includes at least a stamper, a powder material contained in a sealed bag and a tray. In an embodiment, the stamper comprises at least one sponge piece depicting a desired shape adhered to the front surface of a backing material. The sponge pieces protrude outwards in a direction perpendicular to the plane of the backing material. In an embodiment, the back surface of the backing material has a handle built therein, enabling a user to hold the stamper conveniently. In another embodiment, the user can affix a handle, provided with the stamper kit, to the back surface of the backing material.

In an embodiment, the powder material is a calcium carbonate powder that readily dissolves in water and leaves clear bright white marks upon drying. In various embodiments other suitable material such as limestone powder, talcum powder, plaster of Paris, flour, powdered sugar, magnesium carbonate, magnesium silicate, calcium sulphate, calcium hydroxide, colored or white paint powders, or tempura paint powders may be used as the material for making prints on a surface by using the stampers provided by the present specification. The powder material is provided within a sealed bag made of any suitable non-absorbent material such as plastic.

In one embodiment, the tray is a mixing tray and is fabricated from a non-absorbent material such as plastic, metal, metal alloy, thermocol, or rubber.

At step 1206, the sealed bag containing the powder material is opened and a desired quantity of the powder material is measured out into the mixing tray. At step 1208, a predetermined quantity of water is added to the powder material in the mixing tray. In an embodiment, the ratio of the powder material and water to be mixed together is provided on the box. At step 1210, the powder material is mixed with water in the mixing tray in order to obtain a mixture/substance having a paint-like consistency.

At step 1211, the user optionally prepares the sponge by lifting the handles provided on the back surface of the backing.

At step 1212, at least a portion of the sponge pieces on the stamper are dipped into the mixture. In an embodiment, the user holds the stamper conveniently using the handle provided in the backing portion, while dipping at least a portion of the sponge pieces of the stamper in the paint-like mixture. In an embodiment, the stamper is dipped in the mixture such that at least a top surface of the plurality of sponge pieces is completely covered and/or saturated with the paint-like mixture.

At step 1214, prints are created on a desired surface by pressing the stamper on the surface and then lifting the stamper up such that the sponge pieces leave a print of the desired shape on the surface. In various embodiments, the stamper may be used to make a plurality of prints in quick succession by pressing and lifting the sponge pieces on the surface a plurality of times. In some embodiments, multiple prints may be obtained by dipping the sponge pieces in the paint-like mixture only once.

Figure 13:
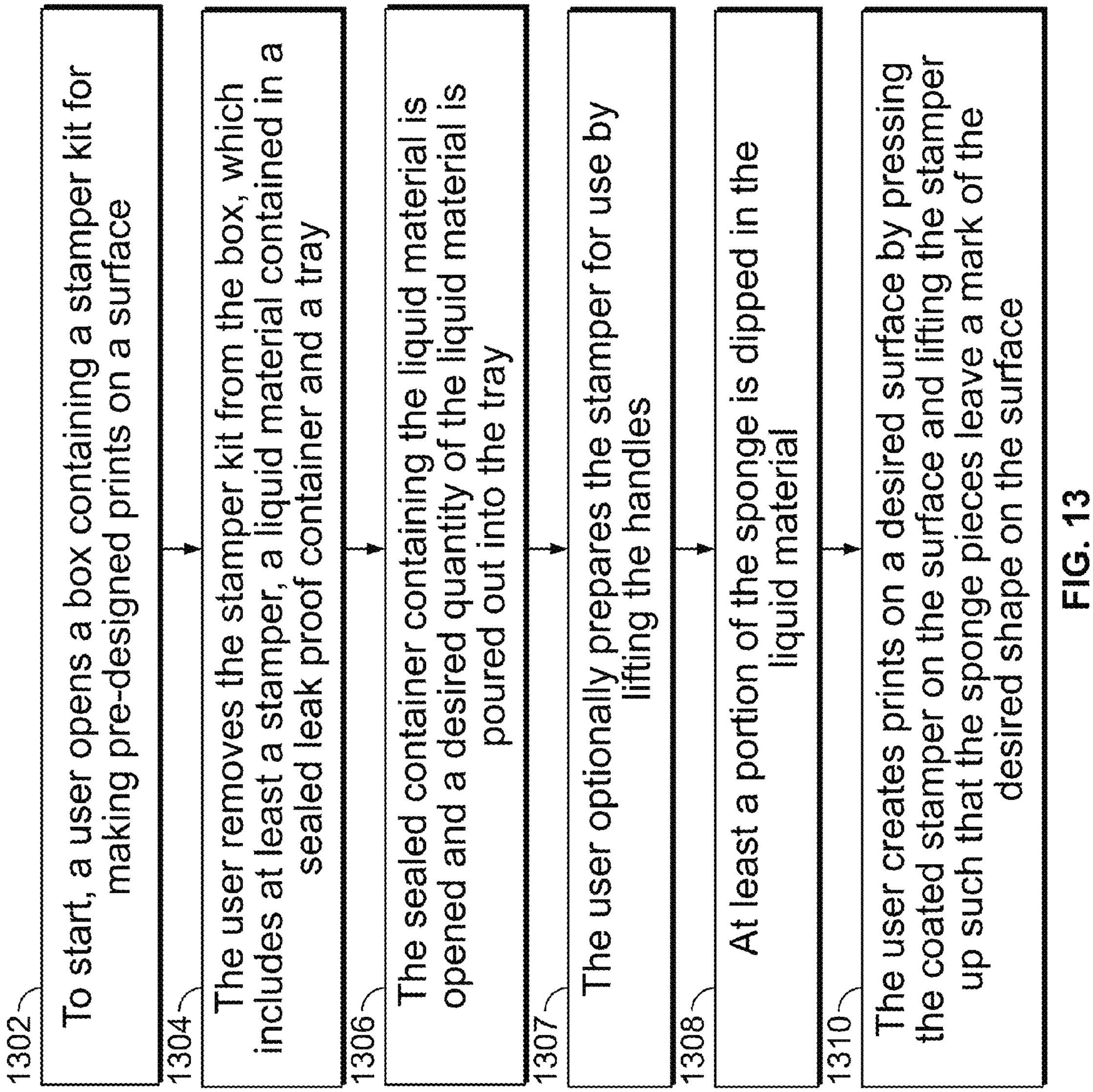
FIG. 13 is a flowchart illustrating another method of using a stamper kit, in accordance with an embodiment of the present specification.

FIG. 13 is a flowchart illustrating another method of using a stamper kit, in accordance with an embodiment of the present specification. At step 1302, a user opens the box containing a stamper kit for making pre-designed prints on a surface provided by the present specification.

At step 1304, the user removes the stamper kit from the box, which includes at least a stamper, a liquid material contained in a sealed leak proof container, and a tray.

In an embodiment, the stamper comprises at least one sponge piece depicting a desired shape adhered to the front surface of a backing material. The sponge pieces protrude outwards in a direction perpendicular to the plane of the backing material. In an embodiment, the back surface of the backing material has a handle built therein, enabling a user to hold the stamper conveniently. In another embodiment, the user can affix a handle, provided with the stamper kit, to the back surface of the backing material.

In an embodiment, the liquid material is tempura paint or any other variety of paint that leaves clear bright prints upon drying. The liquid material is provided within a sealed leak proof container made of any suitable non-absorbent material such as plastic, glass, etc.

In one embodiment, the tray is fabricated from a non-absorbent material such as plastic, metal, metal alloy, thermocol, or rubber.

At step 1306, the sealed container containing the liquid material is opened and a desired quantity of the liquid material is poured out into the tray. At step 1307, a user optionally prepares the stamper for use by lifting up the handles. At step 1308, at least a portion of the sponge pieces of the stamper are dipped in the liquid material. In an embodiment, a user holds the stamper conveniently using the handle provided in the backing portion while dipping the sponge pieces of the stamper in the liquid material. In an embodiment, the stamper is dipped in the liquid material such that at least a top surface of the plurality of sponge pieces is completely covered and/or saturated with the liquid material.

At step 1310 prints are created on a desired surface by pressing the stamper on the surface and then lifting the stamper up such that the sponge pieces leave a mark of the desired shape on the surface. In various embodiments, the stamper may be used to make a plurality of prints in quick succession by pressing and lifting the sponge pieces on the surface a plurality of times. In some embodiments, multiple paw prints may be obtained by dipping the sponge pieces in the liquid material only once.

In some embodiments, the kit described in the present specification may include one or more sponges so that the user can create a series of prints to depict various images. Although requiring more work on the user's part, this approach may be easier to manufacture and gives the user more control over the look of the print. Thus, in some embodiments, the stamp kit of the present specification includes a stamper backing and a plurality of spongy material pieces having an adhesive backing affixed thereto on one side that can be used to affix the sponge pieces onto a front surface of the backing. A user can then place and stick the pre-cut spongy pieces however he/she wishes on the backing to create any desired shape variation. In an embodiment, the front surface of the backing further includes a pre-drawn template(s) so that a user can be guided to create specific types of prints.

Figure 14:
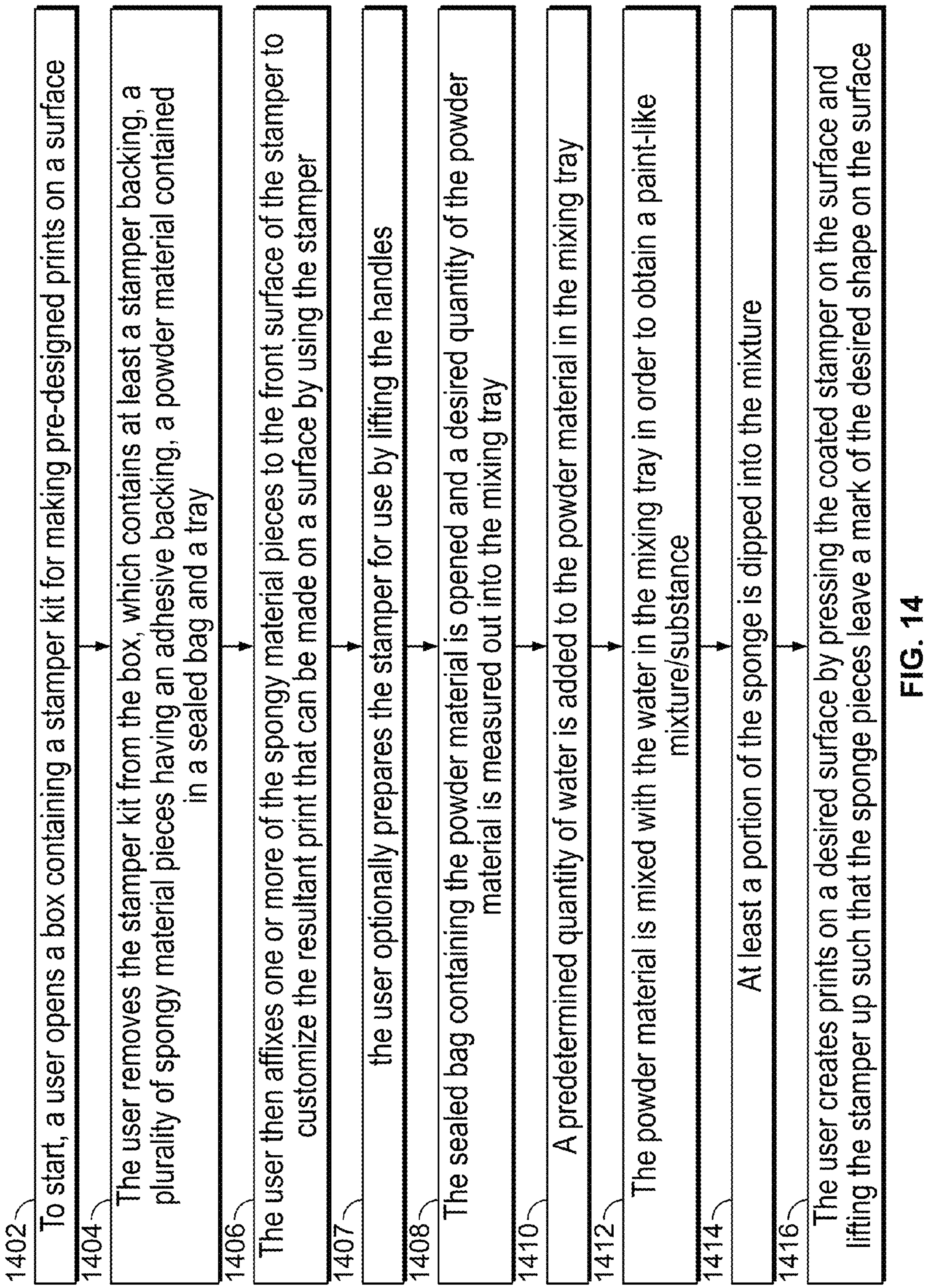
FIG. 14 is a flowchart illustrating yet another method of using a stamper kit, in accordance with an embodiment of the present specification; and, FIG. 15 is a flowchart illustrating yet another method of using a stamper kit, in accordance with an embodiment of the present specification.

Accordingly, FIG. 14 is a flowchart illustrating yet another method of using a stamper kit, in accordance with an embodiment of the present specification. At step 1402, the user opens a box containing a stamper kit for making pre-designed prints on a surface provided by the present specification. At step 1404, the user removes the stamper kit from the box, which includes at least a stamper, a plurality of spongy material pieces having an adhesive backing affixed thereto on one side, a powder material contained in a sealed bag and a tray.

In an embodiment, the powder material is calcium carbonate powder that readily dissolves in water and leaves clear bright white prints upon drying. In various embodiments other suitable material such as limestone powder, talcum powder, plaster of Paris, flour, powdered sugar, magnesium carbonate, magnesium silicate, calcium sulphate, calcium hydroxide, colored or white paint powders, or tempura paint powders may be used as the powder material for making prints on a surface by using the stampers provided by the present specification. The powder material is provided within a sealed bag made of any suitable non-absorbent material such as plastic.

In one embodiment, the tray is a mixing tray and is fabricated from a non-absorbent material such as plastic, metal, metal alloy, thermocol, or rubber.

The stamper comprises a front surface and a back surface. In one embodiment, the front surface includes a plurality of pre-drawn templates. The back surface is lined with a rigid backing material. In an embodiment, the back surface of the backing material has a handle built therein, enabling a user to hold the stamper conveniently. In another embodiment, the user can affix a handle, provided with the stamper kit, to the back surface of the backing material.

The spongy material pieces are adhered to the designs made on the front surface. At step 1406, the user affixes one or more of the spongy material pieces to the front surface of the stamper to customize the resultant print that can be made on a surface by using the stamper. Thus, the sponge pieces protrude outwards in a direction perpendicular to the plane of the backing material. At step 1407, the user optionally prepares the stamper for use by lifting the handles.

At step 1408, the sealed bag containing the powder material is opened and a desired quantity of the powder material is measured out into the mixing tray. At step 1410, a predetermined quantity of water is added to the powder material in the mixing tray. In an embodiment, the ratio of the powder material and water to be mixed together is provided on the box. At step 1412, the powder material is mixed with water in the mixing tray in order to obtain a paint-like consistency.

At step 1414, at least a portion of the sponge pieces on the stamper are dipped into the mixture. In an embodiment, the user holds the stamper conveniently using the handle provided in the backing portion, while dipping at least a portion of the sponge pieces of the stamper in the paint-like mixture. In an embodiment, the stamper is dipped in the mixture, such that at least a top surface of the plurality of sponge pieces is completely covered and/or saturated with the paint-like mixture.

At step 1416 prints are created on a desired surface by pressing the stamper on the surface and then lifting the stamper up such that the sponge pieces leave a mark of the desired shape on the surface. In various embodiments, the stamper may be used to make a plurality of prints in quick succession by pressing and lifting the sponge pieces on the surface a plurality of times. In some embodiments, multiple paw prints may be obtained by dipping the sponge pieces in the paint-like mixture only once.

In some embodiments, the sponge that is affixed to the backing comprises "cut-out" portions that the end user can simply peel away to customize the resultant shape. For example, in the cat paw print provided in FIG. 3A, the tip portions may be provided as cut-out portions so that the sponge can be manipulated into a "softer" cat's paw. A plurality of customization options may be provided depending upon the sponge shape.

In some embodiments, at least a portion of the sponge may be covered with a plastic film so that the end user can color portions of the sponge stamp with different colors.

Figure 15:
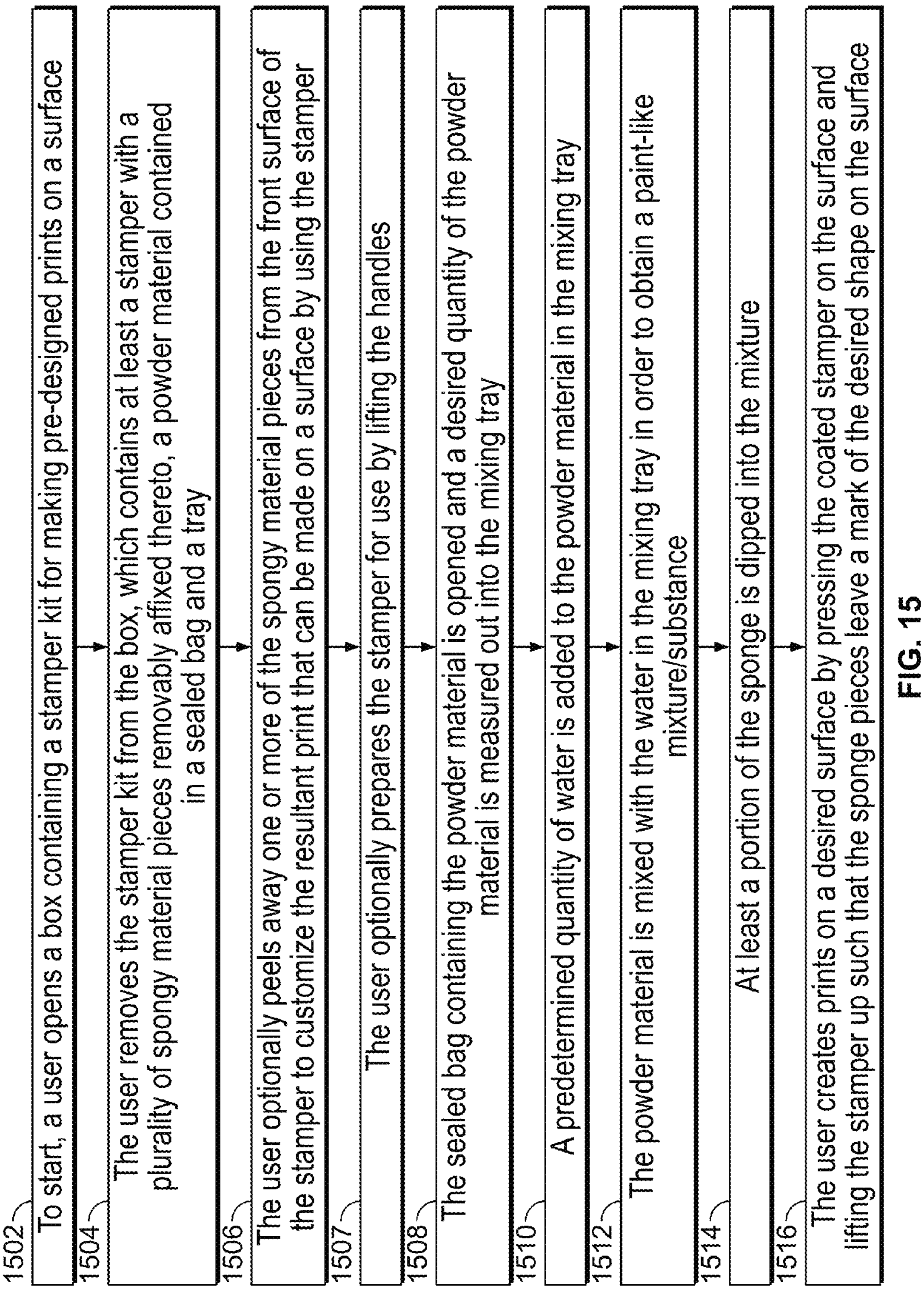

Accordingly, FIG. 15 is a flowchart illustrating yet another method of using a stamper kit, in accordance with an embodiment of the present specification. At step 1502, the user opens a box containing a stamper kit for making pre-designed prints on a surface provided by the present specification. At step 1504, the user removes the stamper kit from the box, which includes at least a stamper with a plurality of spongy material pieces removably affixed thereto, a powder material contained in a sealed bag and a tray.

In an embodiment, the powder material is calcium carbonate powder that readily dissolves in water and leaves clear bright white prints upon drying. In various embodiments other suitable material such as limestone powder, talcum powder, plaster of Paris, flour, powdered sugar, magnesium carbonate, magnesium silicate, calcium sulphate, calcium hydroxide, colored or white paint powders, or tempura paint powders may be used as the powder material for making prints on a surface by using the stampers provided by the present specification. The powder material is provided within a sealed bag made of any suitable non-absorbent material such as plastic.

In one embodiment, the tray is a mixing tray and is fabricated from a non-absorbent material such as plastic, metal, metal alloy, thermocol, or rubber.

The stamper comprises a front surface and a back surface. In one embodiment, the front surface includes a plurality of removable spongy material pieces. The sponge pieces protrude outwards in a direction perpendicular to the plane of the backing material. The back surface is lined with a rigid backing material. In an embodiment, the back surface of the backing material has a handle built therein, enabling a user to hold the stamper conveniently. In another embodiment, the user can affix a handle, provided with the stamper kit, to the back surface of the backing material.

The spongy material pieces are adhered to the designs made on the front surface. At step 1506, the user optionally peels away one or more of the spongy material pieces from the front surface of the stamper to customize the resultant print that can be made on a surface by using the stamper.

At step 1507, the user optionally prepares the stamper for use by lifting the handles.

At step 1508, the sealed bag containing the powder material is opened and a desired quantity of the powder material is measured out into the mixing tray. At step 1510, a predetermined quantity of water is added to the powder material in the mixing tray. In an embodiment, the ratio of the powder material and water to be mixed together is provided on the box. At step 1512, the powder material is mixed with water in the mixing tray in order to obtain a paint-like consistency.

At step 1514, at least a portion of the sponge pieces on the stamper are dipped into the mixture. In an embodiment, the user holds the stamper conveniently using the handle provided in the backing portion, while dipping at least a portion of the sponge pieces of the stamper in the paint-like mixture. In an embodiment, the stamper is dipped in the mixture, such that at least a top surface of the plurality of sponge pieces is completely covered and/or saturated with the paint-like mixture.

At step 1516 prints are created on a desired surface by pressing the stamper on the surface and then lifting the stamper up such that the sponge pieces leave a mark of the desired shape on the surface. In various embodiments, the stamper may be used to make a plurality of prints in quick succession by pressing and lifting the sponge pieces on the surface a plurality of times. In some embodiments, multiple paw prints may be obtained by dipping the sponge pieces in the paint-like mixture only once.

While only a few exemplary shapes are described herein for making print stamps in accordance with the present specification, it will be appreciated that stamps depicting any desired shape may be provided.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A kit for creating a colored shape on a surface comprising:

- at least one stamping device comprising a rigid carrier having a front surface and a back surface and an absorbent material adhered to the front surface, the absorbent material being shaped into a predefined form and being adhered such that it extends outward from the front surface;
- a handle configured to be affixed to said back surface by a user, wherein said handle:
  - has at least one contact portion, said at least one contact portion having a planar surface comprising adhesive;
  - has a pair of grasping portions; and
  - is adapted to be configurable between a first configuration and a second configuration, wherein, when in said first configuration, said handle is designed to lay flat and, when in said second configuration, said contact portions are adhered, via said planar surface comprising adhesive, to said back surface of said rigid carrier and said grasping portions are configured to be handled by said user;
- a solid, granular material; and,
- a tray having a top periphery and a base defining a recessed area.

2. The kit of claim 1, wherein said solid, granular material is contained within a package and wherein the package is configured to fit within the recessed area of said tray.

3. The kit of claim 1, wherein said solid, granular material is a powder material.

4. The kit of claim 3, wherein said powder material is at least partially water soluble and, when mixed with water, forms a solution capable of being absorbed into the absorbent material of the stamping device.

5. The kit of claim 1 wherein said stamping device has a periphery that is configured to fit within the top periphery of said tray.

6. The kit of claim 1, wherein said back surface of said rigid carrier comprises a pre-fixed handle for manipulating said stamping device.

7. The kit of claim 1 wherein the solid, granular material is any one of limestone powder, talcum powder, plaster of Paris, flour, powdered sugar, paint powder, magnesium carbonate, magnesium silicate, calcium sulphate, calcium hydroxide, and alkaline rare earth metal silicate-aluminate oxide europium doped.

8. The kit of claim 1, wherein said absorbent material is any one of sponge rubber, sea sponge, cellulose sponge, natural sponge, low-density polyether sponge, double blown polyester sponge, polyvinyl alcohol (PVA) sponge, polyurethane foam, high density foam, foam rubber, latex foam rubber, NASA foam, miracle foam, evlon foam, viscoelastic foam, high resilience foam, re-bonded foam, closed cell foam, and dry fast foam.

9. The kit of claim 1, further comprising additional pieces of absorbent material, each having an adhesive backing, wherein each of said additional piece of absorbent material is adapted to be adhered on the front surface of said rigid carrier such that each of said absorbent material pieces extends outward from said front surface.

10. A kit for creating a colored shape on a surface comprising:

at least one stamping device, comprising a rigid carrier having a front surface and a back surface and an absorbent material adhered to the front surface, the absorbent material being shaped into a predefined form and being adhered such that it extends outward from the front surface, thereby creating a raised pattern;

a handle configured to be adhered to said back surface by a user, wherein said handle:

has a pair of contact portions, each of the contact portions having a planar surface comprising adhesive;

has a pair of grasping portions; and is adapted to be configurable between a first configuration and a second configuration, wherein, when in said first configuration, said handle is designed to lay flat and, when in said second configuration, said contact portions are adhered, via said planar surface comprising adhesive, to said back surface of said rigid carrier;

a container comprising a liquid material; and, a tray having a top periphery and a base defining a recessed area.

11. The kit of claim 10, wherein said container of liquid material is configured to fit within the recessed area of said tray.

12. The kit of claim 10, wherein said stamping device has a periphery that is configured to fit within the top periphery of said tray.

13. The kit of claim 10, wherein said back surface of said rigid carrier comprises a pre-fixed handle for manipulating said stamping device.

14. The kit of claim 10, wherein said absorbent material is one of sponge rubber, sea sponge, cellulose sponge, natural sponge, low-density polyether sponge, double blown polyester sponge, polyvinyl alcohol (PVA) sponge, polyurethane foam, high density foam, foam rubber, latex foam rubber, NASA foam, miracle foam, evlon foam, viscoelastic foam, high resilience foam, re-bonded foam, closed cell foam, or dry fast foam.

15. The kit of claim 10, further comprising additional pieces of absorbent material, each having an adhesive backing, wherein each of said additional piece of absorbent material is adapted to be adhered on the front surface of said rigid carrier such that each of said absorbent material pieces extends outward from said front surface.

16. A method for creating a colored shape on a surface comprising the steps of:

providing a kit for creating a colored shape on a surface, said kit comprising at least one stamping device, comprising a rigid carrier having a front surface and a back surface and an absorbent material adhered to the front surface, the absorbent material being shaped into a predefined form and being adhered such that it extends outward from the front surface, a powder material and, a tray having a top periphery and a base defining a recessed area;

measuring out a desired quantity of said powder material into said recessed area of said tray;

adding a predetermined amount of water to said powder material;

mixing said powder material with said water to obtain a paint-like mixture;

adhering a handle to said back surface, wherein said handle has a pair of grasping portions and at least one contact portion, said at least one contact portion having a planar surface comprising adhesive and wherein said handle is adhered to said back surface by using the planar surface comprising adhesive to adhere the at least one contact portion to said back surface of said rigid carrier;

lifting said pair of grasping portions perpendicularly to the back surface of said rigid carrier;

using said pair of grasping portions, lifting said rigid carrier and dipping a portion of said absorbent material into said paint-like mixture such that a portion of said paint-like mixture is absorbed into said absorbent material;

using said pair of grasping portions, pressing said absorbent material onto a surface and lifting said absorbent material up such that said absorbent material leaves a mark having said predefined form on said surface.

17. The method of claim 16, wherein said kit further comprises additional pieces of absorbent material, each having an adhesive backing, wherein each of said additional pieces of absorbent material is adapted to be adhered on the front surface of said rigid carrier such that each of said absorbent material pieces extends outward from said front surface, said method further comprising the step of adhering at least one of said additional pieces of absorbent material to said front surface for absorbing said paint-like mixture to create at least one additional mark.

* * * * *